United States Patent
Bito et al.

(10) Patent No.: US 10,934,759 B2
(45) Date of Patent: Mar. 2, 2021

(54) VEHICULAR OPENING/CLOSING BODY CONTROL DEVICE

(71) Applicant: AISIN SEIKI KABUSHIKI KAISHA, Kariya (JP)

(72) Inventors: Yoshiki Bito, Kasugai (JP); Kenta Izumi, Tokai (JP); Takeshi Nishikibe, Tokai (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 165 days.

(21) Appl. No.: 15/923,573

(22) Filed: Mar. 16, 2018

(65) Prior Publication Data

US 2018/0266160 A1 Sep. 20, 2018

(30) Foreign Application Priority Data

Mar. 17, 2017 (JP) .............................. JP2017-053681

(51) Int. Cl.
*E05F 15/40* (2015.01)
*E05F 3/16* (2006.01)
(Continued)

(52) U.S. Cl.
CPC .............. *E05F 15/40* (2015.01); *E05B 83/40* (2013.01); *E05B 85/243* (2013.01); *E05B 85/26* (2013.01);
(Continued)

(58) Field of Classification Search
CPC ... E05F 15/40; E05F 3/16; E05F 5/003; E05F 15/646; E05F 15/659; E05B 85/243;
(Continued)

(56) References Cited

U.S. PATENT DOCUMENTS 4,462,185 A * 7/1984 Shibuki ............... E05D 15/1081
49/218
2002/0153744 A1* 10/2002 Long .......................... B60J 5/06
296/155

(Continued)

FOREIGN PATENT DOCUMENTS

JP 2009-127301 6/2009
JP 2014-194151 10/2014

OTHER PUBLICATIONS

Translation of JP2009127301A corresponding to the IDS dated Mar. 16, 2018 (Year: 2009).*

(Continued)

*Primary Examiner* — Navid Ziaeianmehdizadeh
(74) *Attorney, Agent, or Firm* — Oblon, McClelland, Maier & Neustadt, L.L.P.

(57) ABSTRACT

A vehicular opening/closing body control device includes: a braking control unit configured to apply a braking force to an opening/closing body provided in an opening in a vehicle; a traveling state determination unit configured to determine a traveling state of the vehicle; an abnormality detection unit configured to detect occurrence of a full-closing abnormality in which the opening/closing body is not held in a fully-closed state during the traveling of the vehicle; and a record holding unit configured to hold a detection record of the full-closing abnormality, wherein the braking control unit executes braking control through detection of the full-closing abnormality of the opening/closing body, and in a case where the detection record of the full-closing abnormality is held after the vehicle stops, executes the braking control of the opening/closing body based on the detection record of the full-closing abnormality before the vehicle travels.

14 Claims, 10 Drawing Sheets

(51) Int. Cl.
*E05B 85/26* (2014.01)
*E05B 83/40* (2014.01)
*E05B 85/24* (2014.01)
*B60J 5/06* (2006.01)
*E05F 15/646* (2015.01)
*E05D 15/10* (2006.01)
*E05F 5/00* (2017.01)

(52) U.S. Cl.
CPC . *E05F 3/16* (2013.01); *B60J 5/06* (2013.01); *E05D 15/101* (2013.01); *E05F 5/003* (2013.01); *E05F 15/646* (2015.01); *E05Y 2201/21* (2013.01); *E05Y 2201/216* (2013.01); *E05Y 2201/22* (2013.01); *E05Y 2201/232* (2013.01); *E05Y 2201/688* (2013.01); *E05Y 2400/20* (2013.01); *E05Y 2400/31* (2013.01); *E05Y 2400/334* (2013.01); *E05Y 2400/445* (2013.01); *E05Y 2400/50* (2013.01); *E05Y 2400/502* (2013.01); *E05Y 2400/52* (2013.01); *E05Y 2900/50* (2013.01); *E05Y 2900/531* (2013.01)

(58) Field of Classification Search
CPC .......... E05B 83/40; E05B 85/26; E05B 85/00; E05Y 2900/531; E05Y 2201/21; E05Y 2201/22; E05Y 2201/216; E05Y 2400/334; E05Y 2400/50; E05Y 2900/50; E05Y 2400/31; E05Y 2201/232; E05Y 2400/52; E05Y 2400/502; E05Y 2400/445; E05Y 2400/20; E05Y 2201/688; E05D 15/101; B60J 5/047; B60J 5/06

See application file for complete search history.

(56) References Cited

U.S. PATENT DOCUMENTS

2009/0033256 A1\* 2/2009 Kamiya ................ E05F 15/40
 318/366
2016/0076277 A1\* 3/2016 Kouzuma ............... E05B 81/68
 292/201

OTHER PUBLICATIONS

Translation of JP2014194151A corresponding to the IDS dated Mar. 16, 2018 (Year: 2014).\*

\* cited by examiner

UNLATCHED STATE

WHEN STRIKER ENTERS

HALF-LATCHED STATE

FULLY-LATCHED STATE

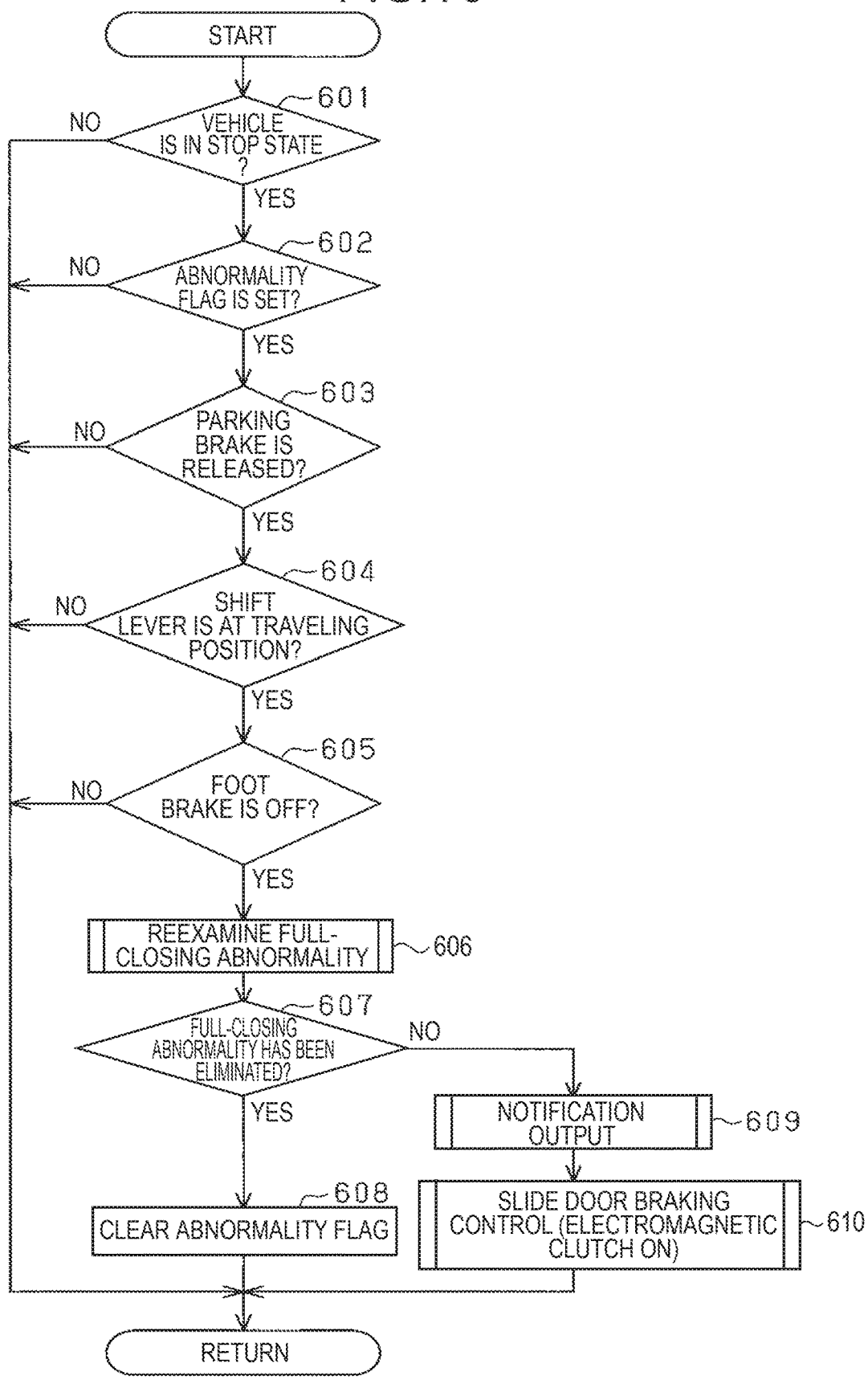

VEHICULAR OPENING/CLOSING BODY CONTROL DEVICE

CROSS REFERENCE TO RELATED APPLICATIONS

This application is based on and claims priority under 35 U.S.C. § 119 to Japanese Patent Application 2017-053681, filed on Mar. 17, 2017, the entire contents of which are incorporated herein by reference.

TECHNICAL FIELD

This disclosure relates to a vehicular opening/closing body control device.

BACKGROUND DISCUSSION

In the related art, for example, JP 2009-127301 A (Reference 1) or JP 2014-194151 A (Reference 2) illustrates an opening/closing body, which applies a braking force to an opening/closing body (e.g., a slide door) in order to describes the opening/closing body to hold an opening/closing operation position thereof. For example, the opening/closing body control device described in Reference 1 executes braking control described above when it is detected that a latch mechanism provided on a slide door of the vehicle is in an unlatched state, i.e. that the slide door is in an opening operation state during the traveling of the vehicle, based on an output signal of a half latch switch provided in the latch mechanism. This ensures the high safety of the slide door by preventing the slide door from being opened any more.

However, generally, the braking control of the slide door described above is terminated by, for example, shift to a non-activation state (IG OFF) or an operation input of a user who intends to open/close the slide door after the vehicle stops. In addition, in the configuration of the related art, for example, in a case where full-closing abnormality occurring in the opening/closing body is caused by a failure of a latch mechanism, there is a risk of the opening/closing body being again opened when the vehicle travels, and in this respect, there still remains a room for improvement.

Thus, a need exists for a vehicular opening/closing body control device which is not susceptible to the drawback mentioned above.

SUMMARY

A vehicular opening/closing body control device according to an aspect of this disclosure includes: a braking control unit configured to apply a braking force to an opening/closing body provided in an opening in a vehicle; a traveling state determination unit configured to determine a traveling state of the vehicle; an abnormality detection unit configured to detect occurrence of a full-closing abnormality in which the opening/closing body is not held in a fully-closed state by a latch mechanism provided on the opening/closing body during the traveling of the vehicle; and a record holding unit configured to hold a detection record of the full-closing abnormality, wherein the braking control unit executes braking control for applying a braking force to the opening/closing body through detection of the full-closing abnormality of the opening/closing body, and in a case where the detection record of the full-closing abnormality is held after the vehicle stops, executes the braking control of the opening/closing body based on the detection record of the full-closing abnormality before the vehicle travels.

BRIEF DESCRIPTION OF THE DRAWINGS

The foregoing and additional features and characteristics of this disclosure will become more apparent from the following detailed description considered with the reference to the accompanying drawings, wherein:

FIG. 16 is a flowchart illustrating a processing procedure when the braking control of the slide door is executed in a case where the detection record of the full-closing abnormality is held after the vehicle stops (upon generation of an operation input of an opening/closing operation).

DETAILED DESCRIPTION

Hereinafter, an embodiment in which a vehicular opening/closing body control device is embodied in a power slide door apparatus will be described with reference to the drawings.

Figure 1:
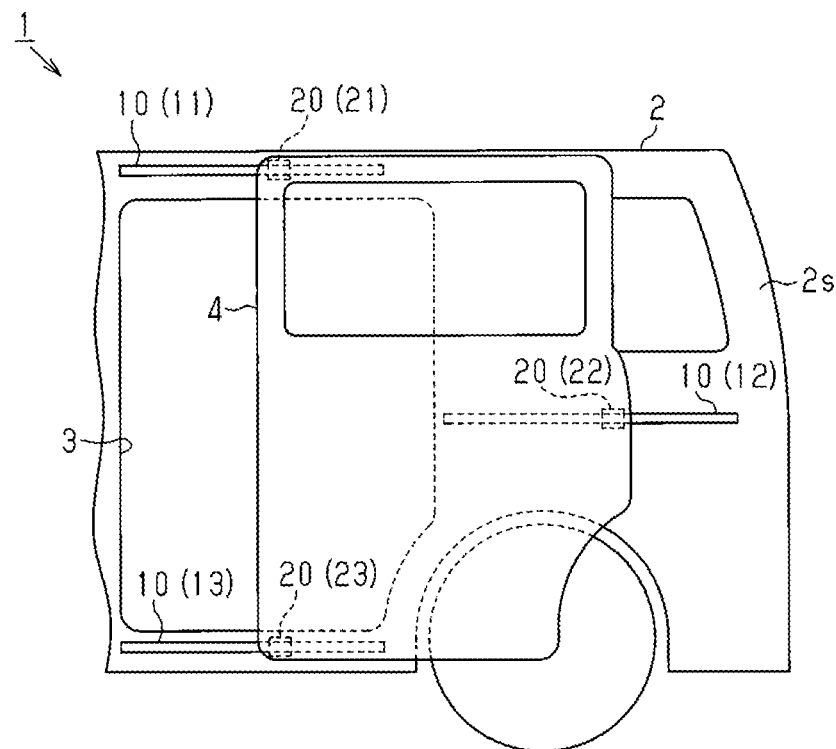
FIG. 1 is a side view of a vehicle having a slide door.

As illustrated in FIG. 1, a vehicle 1 of the present embodiment includes a slide door 4, which opens/closes a door opening 3 provided in a side surface 2s of a vehicle body 2. Specifically, the vehicle 1 is provided with a plurality of (three) guide rails 10 (11 to 13), which extend in a longitudinal direction thereof (a transverse direction in FIG. 1), and a plurality of guide roller units 20 (21 to 23), which are connected to the respective guide rails 10. That is, the slide door 4 of the present embodiment is supported on the side surface 2s of the vehicle body 2 via the respective guide rails 10 and the respective guide roller units 20. In addition, each guide rail 10 and each guide roller units 20 enable movement of an engagement position of each guide roller unit 20 relative to the corresponding guide rail 10 along the extending direction of the guide rail 10. Thus, the slide door 4 of the present embodiment is configured to move in the longitudinal direction of the vehicle along the side surface 2s of the vehicle body 2.

Figure 2:
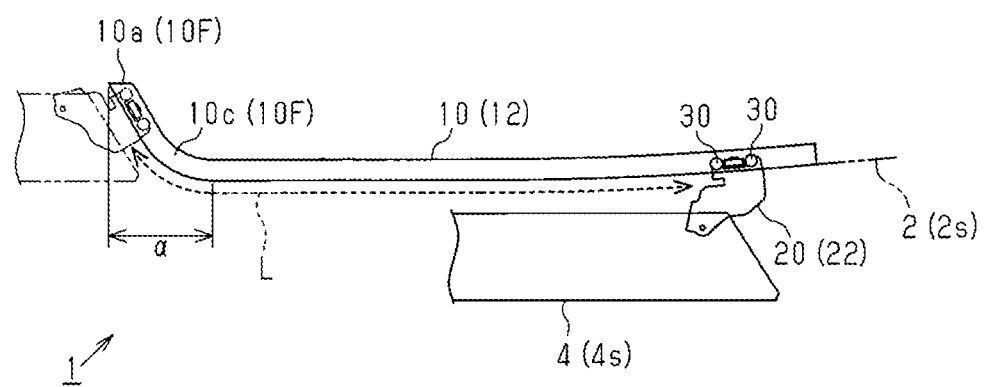
FIG. 2 is a plan view of a guide rail which form a movement path of the slide door and a guide roller.

Specifically, as illustrated in FIG. 2, each guide roller unit 20 of the present embodiment includes a guide roller 30, which is engaged with the corresponding guide rail 10 in a state of being slidable in the extending direction of the guide rail 10. In addition, in FIG. 2, as an example of the guide rail 10 and the guide roller unit 20, a center rail 12, which is provided on the vehicle body 2 side behind the door opening 3, and a center roller unit 22, which is provided on the slide door 4 side and is connected to the center rail 12, are illustrated (see FIG. 1). Thus, the slide door 4 of the present embodiment is configured to be opened/closed along a movement path L, which is formed by the guide rail 10 and the guide roller 30.

More specifically, as illustrated in FIGS. 1 and 2, the slide door 4 becomes a fully-closed state where the slide door 4 closes the door opening 3 by moving to the front side of the vehicle (the left side in each of the drawings). In addition, the slide door 4 becomes a fully-opened state where an occupant of the vehicle 1 may get in or out of the vehicle 1 through the door opening 3 by moving to the rear side of the vehicle (the right side in FIGS. 1 and 2).

In addition, as illustrated in FIG. 2, the guide rail 10 (12) of the present embodiment includes a curved portion α, which is curved in a width direction of the vehicle, in a closing operation side end portion (the left end portion in FIG. 2) 10F, which is disposed in the closing operation direction of the slide door 4. More specifically, the guide rail 10 is provided with a corner portion 10c, which deflects the movement path L of the slide door 4 inward in the width direction of the vehicle (upward in FIG. 2) toward the closing operation direction of the slide door 4, at an opening operation side position than a closing operation side terminal 10a. Thus, the vehicle 1 of the present embodiment is configured such that the slide door 4 moves in the longitudinal direction of the vehicle while being displaced in the width direction of the vehicle.

That is, in the case where the slide door 4 of the present embodiment is in the fully-closed state (at the position indicated by the two-dot chain line in FIG. 2), the slide door 4 is disposed such that an outer surface 4s thereof is substantially with the side surface 2s of the vehicle body 2 on which the guide rail 10 is provided. In addition, the slide door 4 moves to the vehicle rear side while being displaced outward in the width direction of the vehicle (downward in FIG. 2) when opened from the fully-closed state. Thus, the slide door 4 of the present embodiment is configured not to interfere with the side surface 2s of the vehicle body 2 even at the time of opening thereof.

Figure 3:
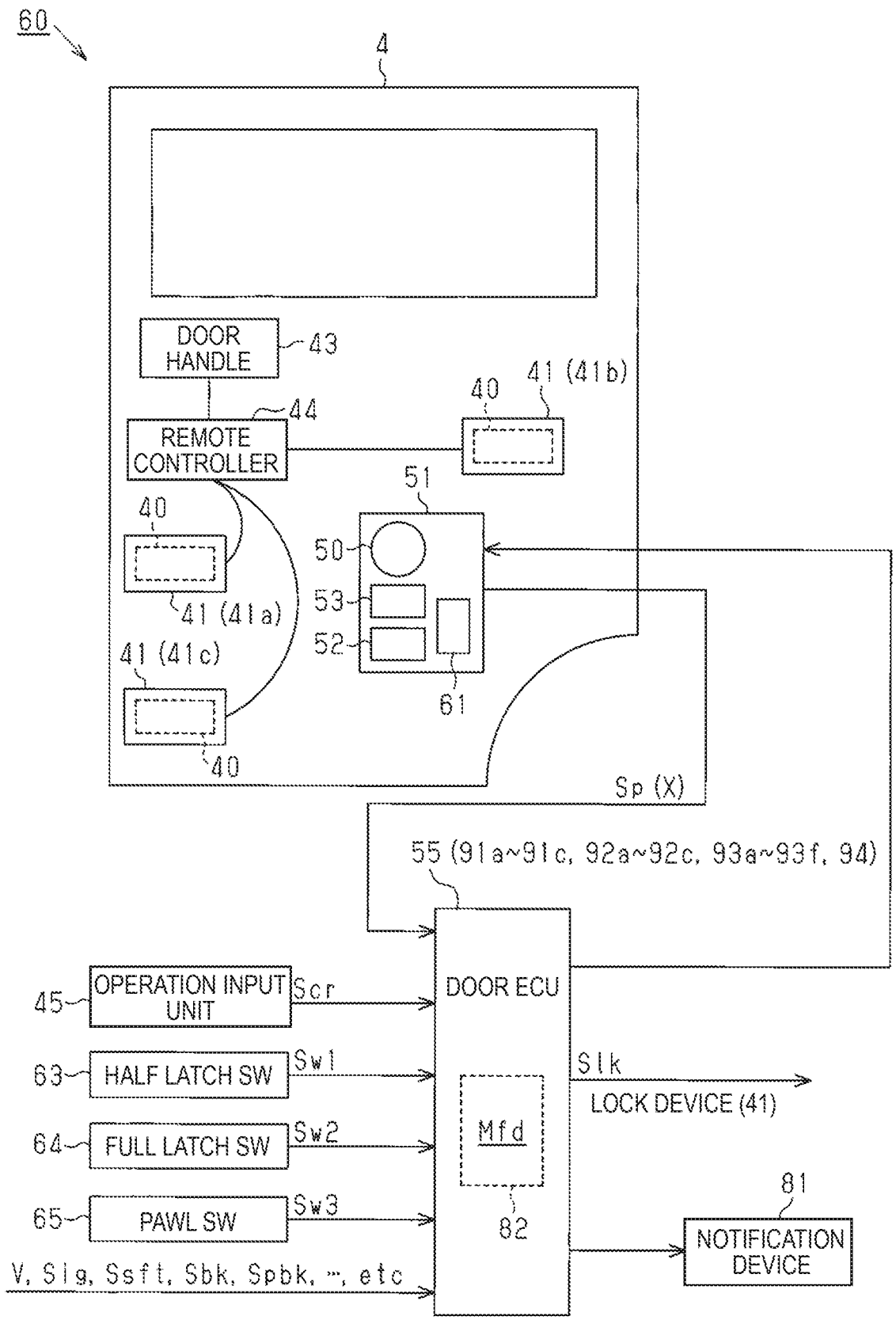
FIG. 3 is a view illustrating a schematic configuration of a power slide door apparatus.

In addition, as illustrated in FIG. 3, the slide door 4 of the present embodiment is provided with a lock device 41 having a latch mechanism 40, which is engaged with a striker (not illustrated) in order to restrain the slide door 4 to the vehicle body 2. Specifically, the slide door 4 is provided with a front lock 41a and a rear lock 41b, which serve as full-closing locks in order to hold the slide door 4 in the fully-closed state. Moreover, the slide door 4 is provided with a full-opening lock 41c for holding the slide door 4 at a fully-opened position. In addition, the slide door 4 of the present embodiment is provided with a door handle (an outside door handle and an inside door handle) 43, which releases the restriction of the latch mechanism 40 constituting each lock device 41 for opening/closing the slide door 4.

That is, in the slide door 4 of the present embodiment, an operating force input to the door handle 43 is mechanically transmitted to each lock device 41 via a remote controller (remote control device) 44, which is connected thereto by a transmission member such as, for example, a wire cable or a link. Thus, the slide door 4 of the present embodiment is configured to be opened/closed, for example, by the door handle 43, which serves as a grip element, by releasing the engagement of the latch mechanism 40 with respect to the striker, and consequently, by being released from a state restrained to the vehicle body 2 to the fully-closed state or the fully-opened state.

In addition, the slide door 4 of the present embodiment is configured such that the engagement state of the latch mechanism 40 constituting the lock device 41 can be released even when a user operates an operation input unit 45, which is provided in, for example, the door handle 43, a vehicle room, or a portable device. In addition, the slide door 4 of the present embodiment is provided with a door actuator 51, which uses a motor 50 as a drive source so as to open/close the slide door 4.

Specifically, the door actuator 51 includes an opening/closing drive unit 52, which opens/closes the slide door 4 via a drive cable (not illustrated). In addition, in the door actuator 51 of the present embodiment, an electromagnetic clutch 53 is interposed between the opening/closing drive unit 52 and the motor 50. Moreover, in the slide door 4 of the present embodiment, an operation of the door actuator 51 is controlled by a door ECU 55. Thus, the slide door 4 of the present embodiment is configured as a power slide door apparatus 60, which is opened/closed based on a drive force of the motor 50.

Specifically, an operation input signal Scr, which indicates that the operation input unit 45 is operated, is input to the door ECU 55 of the present embodiment. In addition, the door ECU 55 of the present embodiment controls an operation of the slide door 4 based on an operation request of the user, which is indicated by the operation input signal Scr.

More specifically, the door ECU 55 of the present embodiment controls an operation of the door actuator 51 so as to move the slide door 4 in an opening/closing operation direction indicated by the operation request (door driving control). In addition, when opening/closing the slide door 4 from the fully-opened state or the fully-closed state, the door ECU 55 first controls an operation of the lock device 41 by outputting a lock control signal Slk so as to release the latch mechanism 40, which restrains the slide door 4 to the vehicle body 2, before starting the door driving control (release control). In addition, when the slide door 4 has moved to an opening/closing operation position X at which the slide door 4 becomes the fully-closed state, the door ECU 55 controls the operation of the lock device 41 so as to shift the latch mechanism 40 from a half-latched state to a fully-latched state by the output of the lock control signal Slk (closing control).

Moreover, the door ECU 55 of the present embodiment controls the operation of the electromagnetic clutch 53 provided in the door actuator 51 to connect and disconnect a torque transmission path between the motor 50 and the opening/closing drive unit 52. That is, during the door driving control, the rotation of the motor 50 is controlled so as to bring the electromagnetic clutch 53 into a state of connecting the transmission path of a drive force to the slide door 4 (ON operation). In addition, during the manual operation by the user, the transmission path of the drive force is disconnected by an operation (OFF operation) of the electromagnetic clutch 53. Thus, the power slide door apparatus 60 of the present embodiment is configured to allow the slide door 4 to be smoothly opened/closed.

In addition, the door actuator 51 of the present embodiment is configured to apply a braking force to the slide door 4 based on, for example, the cogging torque of the stopped motor 50 or the frictional force of a deceleration mechanism by bringing the electromagnetic clutch 53 into a connection state in a state where the motor 50 stops. Thus, the power slide door apparatus 60 of the present embodiment is configured to be able to hold the opening/closing operation position X of the slide door 4.

More specifically, the door actuator 51 of the present embodiment is provided with a pulse sensor 61, which outputs a pulse signal Sp synchronized with the rotation of the motor 50. In addition, the door ECU 55 of the present embodiment detects the opening/closing operation position X (and the movement speed) of the slide door 4 by counting the pulse signal Sp.

In addition, for example, a vehicle speed V and an ignition signal Sig, a shift position signal Ssft, a brake signal Sbk, and a parking brake signal Spbk of the vehicle 1 are input to the door ECU 55 of the present embodiment. In addition, the door ECU 55 of the present embodiment controls the operation of the slide door 4 based on the vehicle status quantities thereof and control signals.

Moreover, respective output signals Sw1 to Sw3 of a half latch switch 63, a full latch switch 64, and a pawl switch 65 provided in the latch mechanism 40 constituting the lock device 41 are input to the door ECU 55 of the present embodiment. In addition, the door ECU 55 of the present embodiment is configured to detect the engagement state of the latch mechanism 40 based on the output signals Sw1 to Sw3 of the respective sensor switches 63 to 65.

Figure 4:
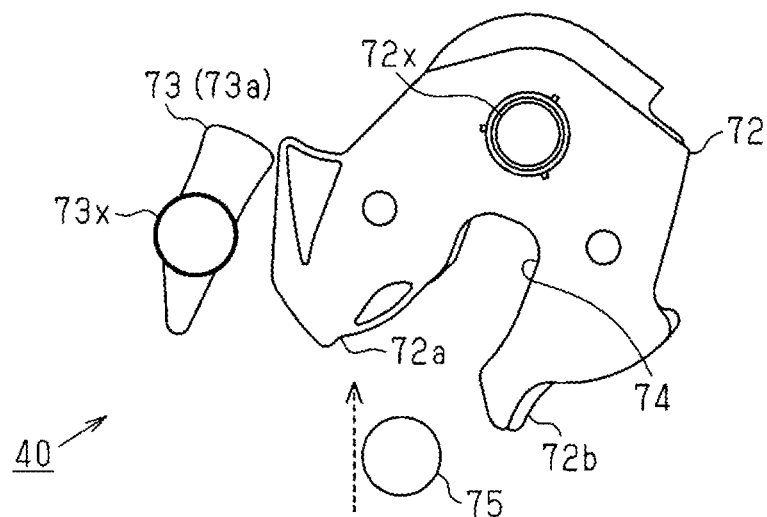
FIG. 4 is an explanatory view illustrating a latch mechanism (unlatched state)

Specifically, as illustrated in FIG. 4, each latch mechanism 40 of the present embodiment includes a latch 72 and a pawl 73, which are pivotally supported to be rotatable around support shafts 72x and 73x thereof, respectively. The latch 72 of the present embodiment has a substantially flat outer shape having an open striker engagement groove 74 in the outer peripheral surface thereof. In addition, the latch 72 is compressed to rotate in a counterclockwise direction in each of the drawings by a latch compression spring (not illustrated). Moreover, the latch 72 is brought into contact with a stopper portion (not illustrated) so that the rotation of the latch 72 based on the compression force of the latch compression spring is restricted at a position where the open end of the striker engagement groove 74 faces a striker 75 provided on the periphery of the door opening 3. Thus, the latch mechanism 40 of the present embodiment is configured such that the striker 75 on the vehicle body 2 side is engaged with the striker engagement groove 74 in the latch 72 according to the closing operation of the slide door 4.

Meanwhile, in the latch mechanism 40 of the present embodiment, the pawl 73 is compressed to rotate in a clockwise direction in each of the drawings by a pawl compression spring (not illustrated). In addition, the pawl 73 of the present embodiment is rotated based on the compression force of the pawl compression spring so that a tip end portion 73a thereof is in sliding contact with the outer peripheral surface of the latch 72. Moreover, the pawl 73 is configured such that the tip end portion 73a thereof is engaged with the outer peripheral surface of the latch 72 in a state where the striker 75 is engaged with the striker engagement groove 74. Thus, the latch mechanism 40 of the present embodiment can hold the state in which the striker 75 is engaged with the striker engagement groove 74 in the latch 72.

Figure 5:
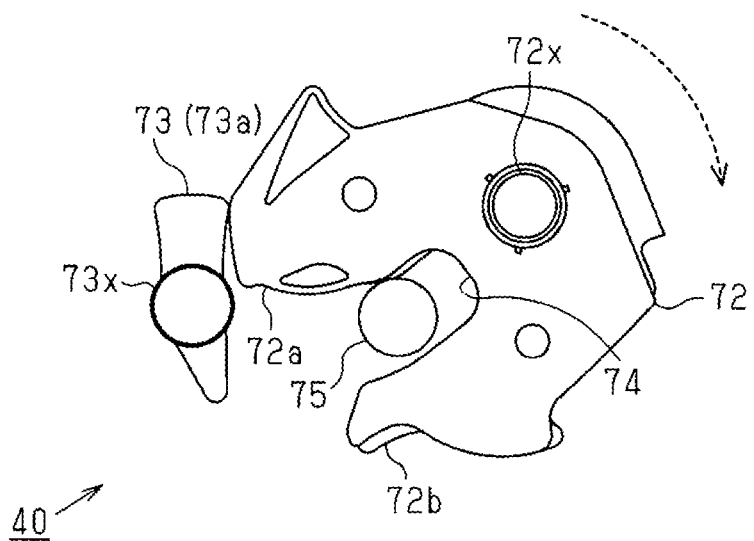
FIG. 5 is an explanatory view illustrating the latch mechanism (when a striker enters)
Figure 6:
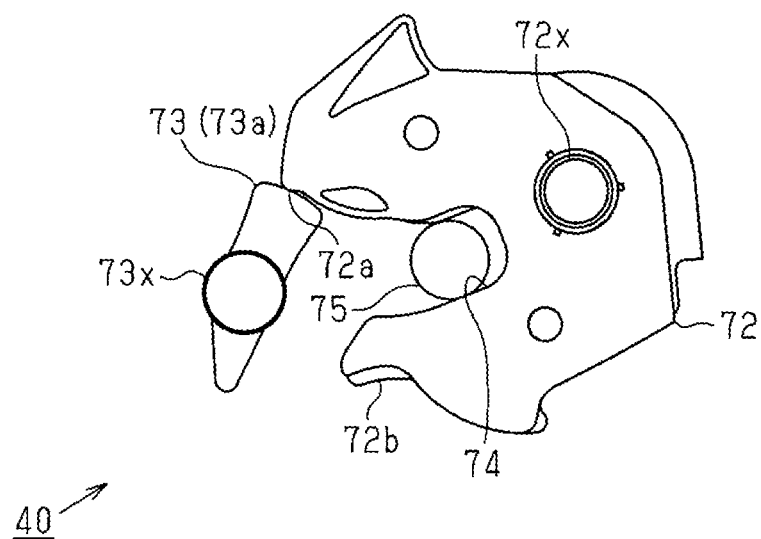
FIG. 6 is an explanatory view illustrating the latch mechanism (half-latched state)

That is, as illustrated in FIGS. 5 and 6, the striker 75 engaged with the striker engagement groove 74 moves inward relative to the striker engagement groove 74 while pressing the latch 72. Thus, the latch 72 rotates in the clockwise direction in each of the drawings against the compression force of the latch compression spring.

In addition, at this time, the tip end portion 73a of the pawl 73 is in a state of being pressed on the outer peripheral surface of the latch 72 based on the compression force of the pawl compression spring, and apparently slides on the outer peripheral surface of the latch 72 in contact therewith. Thus, the latch mechanism 40 of the present embodiment is configured such that the rotation of the latch 72 is restricted when the tip end portion 73a of the pawl 73 is engaged with a first engagement portion 72a of the latch 72 formed on the outer peripheral surface thereof (half-latched position).

More specifically, in the latch 72 of the present embodiment, the first engagement portion 72a is set to the open end of the striker engagement groove 74, specifically, a side wall surface to be pressed by the engaged striker 75. Thus, the latch mechanism 40 of the present embodiment is configured to restrict the rotation of the latch 72 in a compression direction by the latch compression spring, consequently, in the counterclockwise direction in each of the drawings in which the striker 75 is discharged from the striker engagement groove 74, thereby holding the state where the striker 75 is engaged with the latch 72 (half-latched state).

Figure 7:
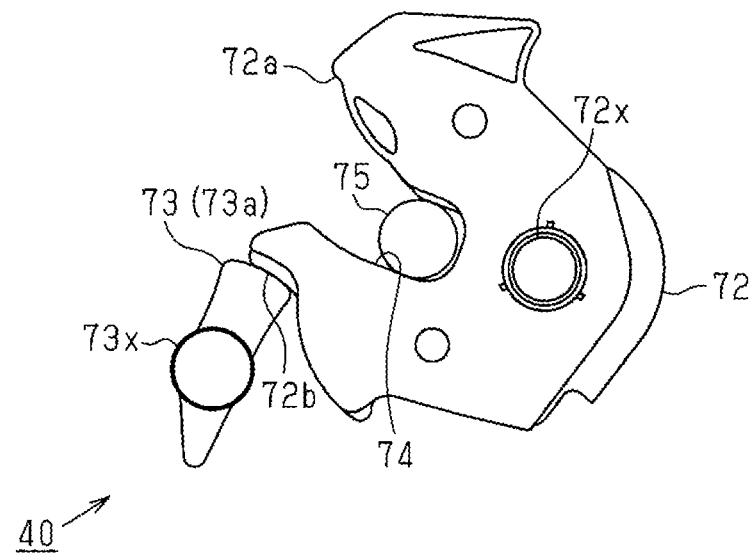
FIG. 7 is an explanatory view illustrating the latch mechanism (fully-latched state)

In addition, as illustrated in FIGS. 6 and 7, in the latch mechanism 40 of the present embodiment, the latch 72 may further rotate (in the clockwise direction in each of the drawings) from a rotating position, which corresponds to the half-latched state, against the compression force of the latch compression spring. In addition, the latch mechanism 40 of the present embodiment is configured such that the latch 72 rotates in a closing direction beyond the half-latched position based on the operating force of the user input to the slide door 4 or the drive force of a closure device (not illustrated), an operation of which is controlled by the lock control signal Slk output from the door ECU 55. Moreover, the pawl 73 is engaged with a second engagement portion 72b formed on the outer peripheral surface of the latch 72 by the rotation of the latch 72 (fully-latched position). Specifically, the second engagement portion 72b is formed at a position at which the tip end portion 73a of the pawl 73, which is in sliding contact with the outer peripheral surface of the latch 72, has passed the striker engagement groove 74. Thus, the latch mechanism 40 of the present embodiment is configured to shift to the fully-latched state where the striker 75 engaged with the striker engagement groove 74 in the latch 72 is restrained so that relative movement thereof is impossible.

Moreover, the latch mechanism 40 of the present embodiment is configured such that the pawl 73 rotates in the counterclockwise direction in each of the drawings against the compression force of the pawl compression spring based on the operating force input to the door handle 43 or the drive force of a release actuator (not illustrated), the operation of which is controlled by the lock control signal Slk output from the door ECU 55. Thereby, the latch 72 rotates in a release direction (the counterclockwise direction in each of the drawings) based on the compression force of the latch compression spring as the restriction of rotation thereof due to engagement with the pawl 73 is released. Thus, the latch mechanism 40 of the present embodiment is configured to return to the unlocked state illustrated in FIG. 4 by releasing the restriction of the striker 75 and discharging the striker 75 from the striker engagement groove 74.

Figure 8:
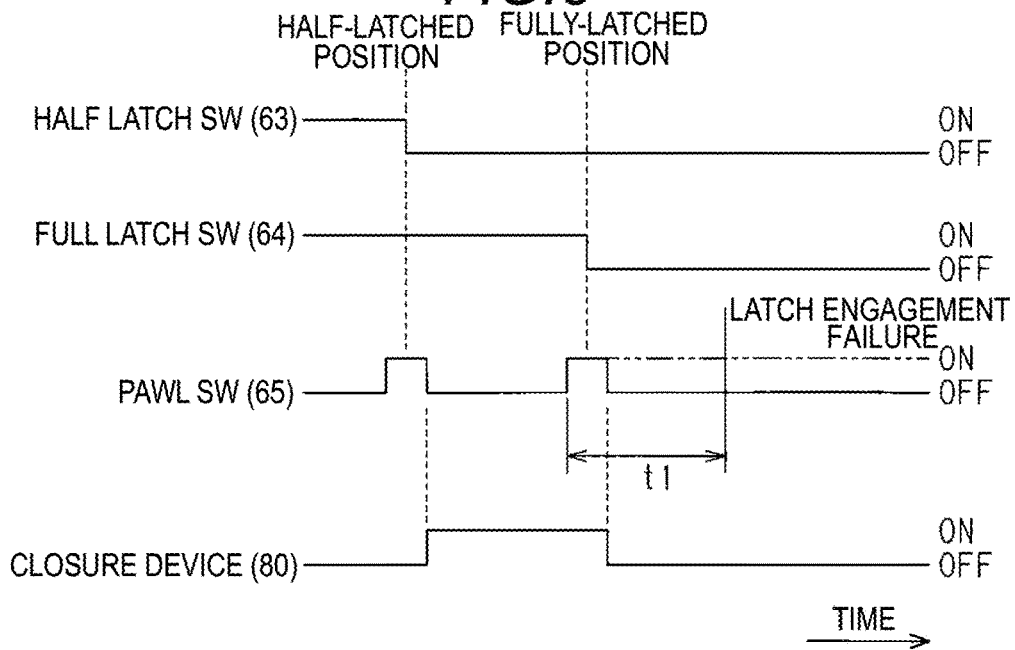
FIG. 8 is an explanatory view illustrating operations of sensor switches provided in the latch mechanism.

As illustrated in FIG. 8, each lock device 41 of the present embodiment is configured such that the ON and OFF states of the half latch switch 63, the full latch switch 64, and the pawl switch 65, that is, the output signals Sw1 to Sw3 of the respective sensor switches vary in conjunction with the engagement operation of the latch mechanism 40.

Specifically, in a process (see FIGS. 4 to 6) in which the latch mechanism 40 shifts from the unlatched state to the half-latched state, the pawl switch 65 of the present embodiment is switched from the OFF state to the ON state and from the ON state to the OFF state in conjunction with an operation (reciprocal rotation) of the pawl 73, which is in sliding contact with the outer peripheral surface of the latch 72 when the pawl 73 is engaged with the first engagement portion 72a of the latch 72. That is, the pawl switch 65 of the present embodiment is configured to become the ON state as the pawl 73 rotates in the direction in which it is disengaged from the latch 72. At this time, the half latch switch 63 of the present embodiment is configured to be switched from the ON state to the OFF state at a timing between the ON timing and the OFF timing of the pawl switch 65.

In addition, in the process in which the latch mechanism 40 shifts from the half-latched state to the fully-latched state (see FIGS. 6 and 7), the pawl switch 65 of the present embodiment is also switched from the OFF state to the ON state and from the ON state to the OFF state in conjunction with the operation (reciprocal rotation) of the pawl 73 even when the pawl 73 is engaged with the second engagement portion 72b of the latch 72. At this time, the full latch switch 64 of the present embodiment is also configured to be switched from the ON state to the OFF state at a timing between the ON timing and the OFF timing of the pawl switch 65.

The door ECU 55 of the present embodiment detects the engagement state of the latch mechanism 40 based on the respective output signals Sw1 to Sw3 indicating the ON and OFF states of the half latch switch 63, the full latch switch 64, and the pawl switch 65. In addition, the door ECU 55 of the present embodiment operates a closure device 80 at a timing when the half latch switch 63 is switched from the ON state to the OFF state and then the pawl switch 65 is switched from the ON state to the OFF state. Thereafter, the door ECU 55 stops the closure device 80 at a timing when the full latch switch 64 is switched from the ON state to the OFF state and then the pawl switch 65 is switched from the ON state to the OFF state.

In addition, the door ECU 55 determines whether or not there is a contradiction (logic error) in the ON/OFF pattern of the output signals Sw1 to Sw3 of the respective sensor switches 63 to 65. Thus, the door ECU 55 is configured to determine detection of a failure of the latch mechanism 40.

(Determination of Detection of Engagement Failure Occurring in Latch Mechanism and Braking Control of Slide Door)

Next, the determination of detection of an engagement failure occurring in the latch mechanism 40 and the braking control of the slide door, which are executed by the door ECU 55 of the present embodiment, will be described.

Figure 9:
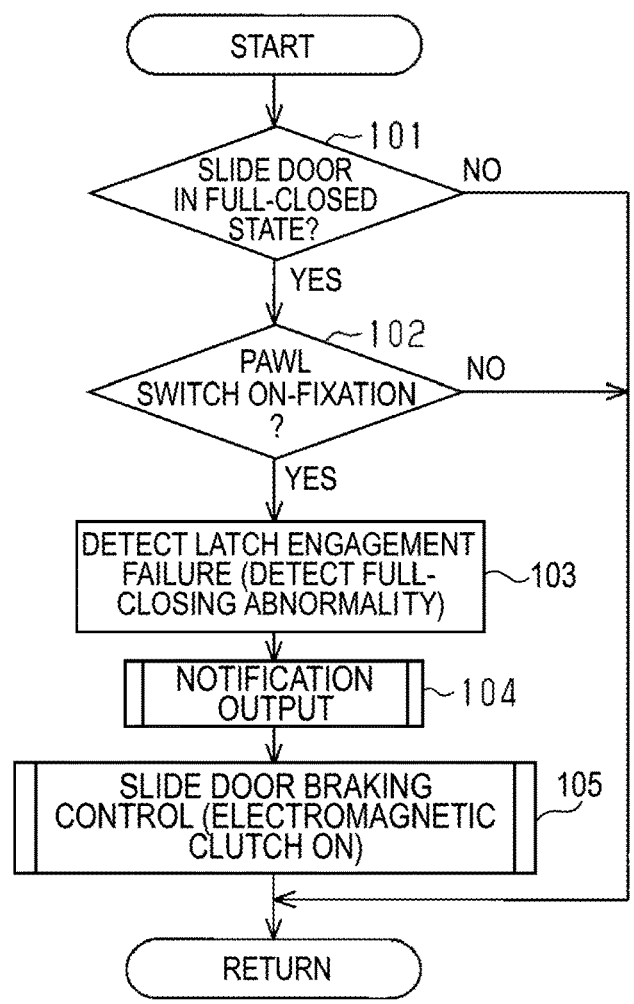
FIG. 9 is a flowchart illustrating a mode of braking control of the slide door, which is executed when an engagement failure of the latch mechanism is detected.

As illustrated in the flowchart of FIG. 9, in the case where the slide door 4 is in the fully-closed state (YES in step 101), the door ECU 55 of the present embodiment determines whether or not the pawl switch 65 provided in the latch mechanism 40 is in the ON state (ON-fixation) (step 102). In addition, in step 101, the door ECU 55 of the present embodiment determines that the slide door 4 is in the fully-closed state when both the half latch switch 63 and the full latch switch 64 are in the OFF state (see FIG. 8). Further, when the pawl switch 65 is in the ON-fixation state (YES in step 102), the door ECU 55 determines that an engagement failure has occurred in the latch mechanism 40 so that the latch mechanism 40 cannot hold the slide door 4 in the fully-closed state (latch engagement failure detection, step 103).

That is, as described above, for example, when the latch 72 is driven by the closure device 80 to rotate from the half-latched position to the fully-latched position (see FIGS. 6 and 7), the pawl 73 of the latch mechanism 40 first rotates in the disengagement direction (the counterclockwise direction in each of the drawings) so as to be pushed by the latch 72, and then rotates again in the engagement direction (the clockwise direction). In addition, the pawl switch 65 is switched between the ON state and the OFF state in conjunction with the reciprocal rotation of the pawl 73. Therefore, when the pawl switch 65 is in the ON-fixation state, the state where the pawl 73 is disengaged from the latch 72 is continued. In conclusion, it is considered that the latch mechanism 40 is in the state where it cannot hold the slide door 4 in the fully-closed state.

Based on this, as illustrated in FIG. 8, in the case where the pawl switch 65 is switched from the OFF state to the ON state and then the full latch switch 64 is switched from the ON state to the OFF state, the door ECU 55 of the present embodiment determines that the engagement failure has occurred in the latch mechanism 40 when the pawl switch 65 is in the ON state for a predetermined time t1 or longer.

In addition, when detecting the engagement failure of the latch mechanism 40 in step 103 of the flowchart illustrated in FIG. 9, the door ECU 55 of the present embodiments executes notification output indicating that the engagement failure has been detected, for example, using a notification device 81 (see FIG. 3) such as, for example, a speaker or a warning lamp (step 104).

Moreover, the door ECU 55 of the present embodiment turns on the electromagnetic clutch 53 of the door actuator 51, which opens or closes the slide door 4, in the state where the motor 50 of the door actuator 51 stops. That is, the door ECU 55 applies a braking force to the slide door 4 by bringing the transmission path of the drive force to the slide door 4 into a connection state (braking control, step 105). Thus, the power slide door apparatus 60 of the present embodiment is configured to prevent the slide door 4 from being opened in the fully-closed state due to, for example, acceleration or deceleration of the vehicle 1 even when the vehicle 1 travels in the state where the engagement failure has occurred in the latch mechanism 40, that is, even when full-closing abnormality occurs in which the slide door 4 is not held in the fully-closed state during the traveling of the vehicle 1.

Figure 10:
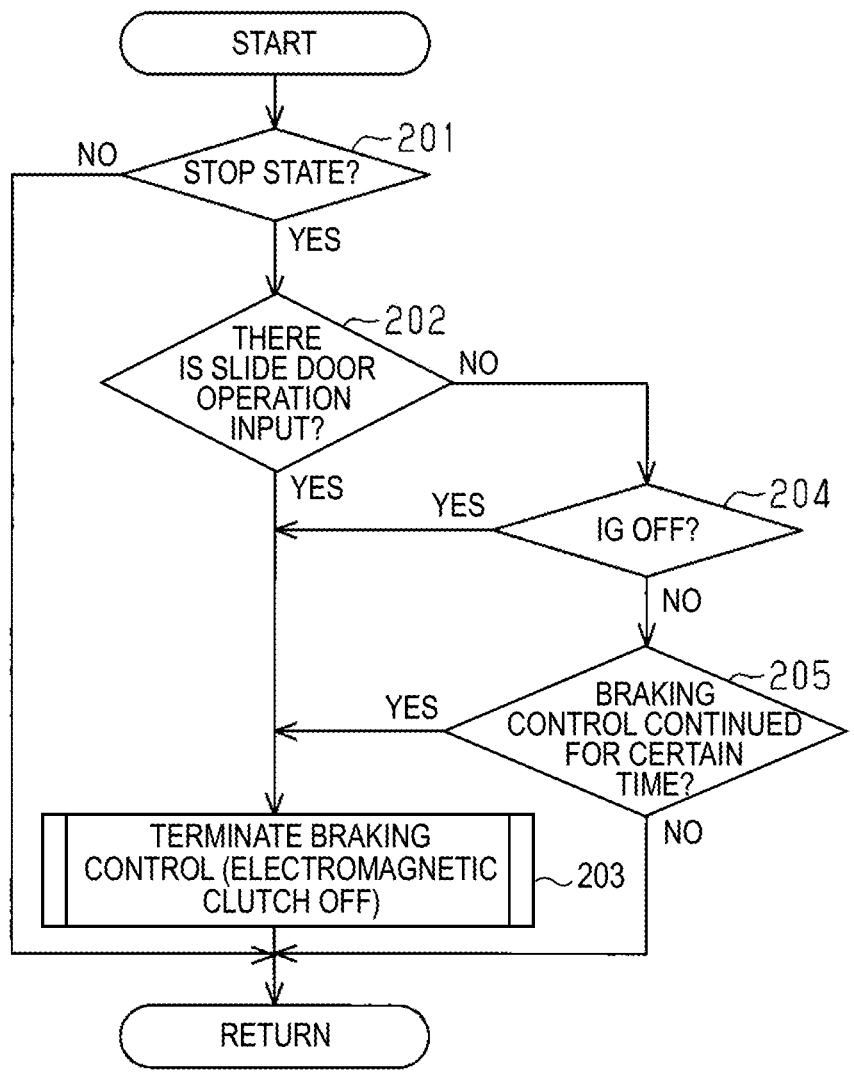
FIG. 10 is a flowchart illustrating a processing procedure when the braking control of the slide door is terminated.

In addition, as illustrated in the flowchart of FIG. 10, in the case where the vehicle 1 is in the stop state (YES in step 201), the door ECU 55 of the present embodiment turns off the electromagnetic clutch 53 of the door actuator 51 when there is an operation input of the user who intends to open/close the slide door 4 (YES in step 202). That is, the door ECU 55 terminates the braking control of the slide door 4 by disconnecting the transmission path of the drive force to the slide door 4 (step 203). Thus, the power slide door apparatus 60 of the present embodiment is configured not to prevent the opening/closing operation of the slide door 4 by the intention of the user.

Moreover, in step 203, the door ECU 55 of the present embodiment terminates the braking control of the slide door 4 when the vehicle 1 shifts to a non-activation state (IG OFF, YES in step 204) and when the braking control of the slide door 4 continues for a certain time (YES in step 205). Thus, the door ECU 55 is configured to prevent consumption of an in-vehicle power supply (battery) (not illustrated).

(Braking Control of Slide Door During Traveling of Vehicle)

Next, descriptions will be made of the braking control of the slide door 4 during the traveling of the vehicle, which is executed by the door ECU 55 of the present embodiment.

Figure 11:
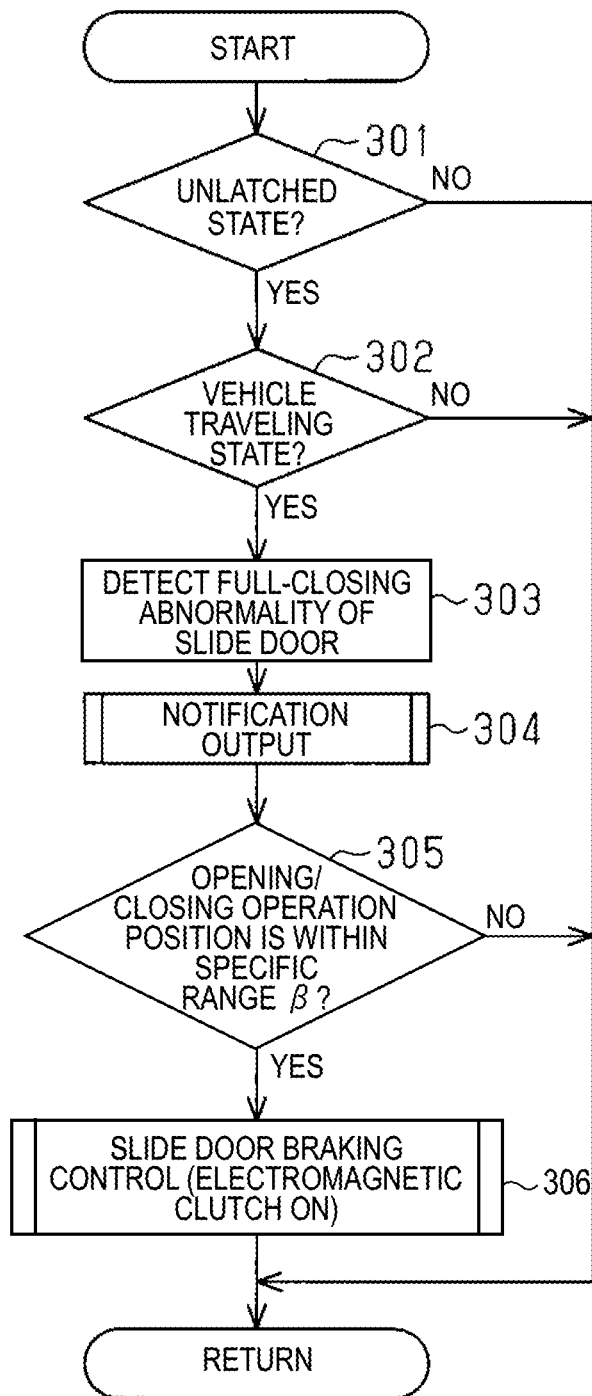
FIG. 11 is a flowchart illustrating a mode of braking control of the slide door, which is executed when the slide door is in an opening operation state during the traveling of the vehicle.

As illustrated in the flowchart of FIG. 11, in the case where the latch mechanism 40 of the slide door 4 is in the unlatched state (YES in step 301) and the vehicle 1 is traveling (YES in step 302), the door ECU 55 of the present embodiment determines that full-closing abnormality occurs in the slide door 4 (full-closing abnormality detection, step 303). In addition, the door ECU 55 executes notification output indicating that the full-closing abnormality has been detected (step 304).

That is, the slide door 4 may be held in the fully-closed state in the vehicle body 2 during the traveling of the vehicle 1. Based on this, the door ECU 55 of the present embodiment determines the full-closing abnormality in which the slide door 4 of the vehicle 1 does not satisfy the aforementioned operation requirement when the latch mechanism 40 is in the unlatched state, that is, when the slide door 4 is in the opening operation state during the traveling of the vehicle 1. In addition, in this case, the door ECU 55 is configured to notify an occupant of the vehicle 1 of the detection of the full-closing abnormality through the execution of the notification output using the notification device 81.

In addition, subsequent to the execution of the notification output in step 304, the door ECU 55 of the present embodiment determines whether or not the opening/closing operation position X of the slide door 4 is within a specific range β set in the movement path L of the slide door 4 at this time (step 305). In addition, when the opening/closing operation position X of the slide door 4 is within the preset specific range β (YES in step 305), the door ECU 55 is configured to apply a braking force to the slide door 4 by turning on the electromagnetic clutch 53 of the door actuator 51 through the execution of the braking control, thereby holding the opening/closing operation position X (step 306).

Figure 12:
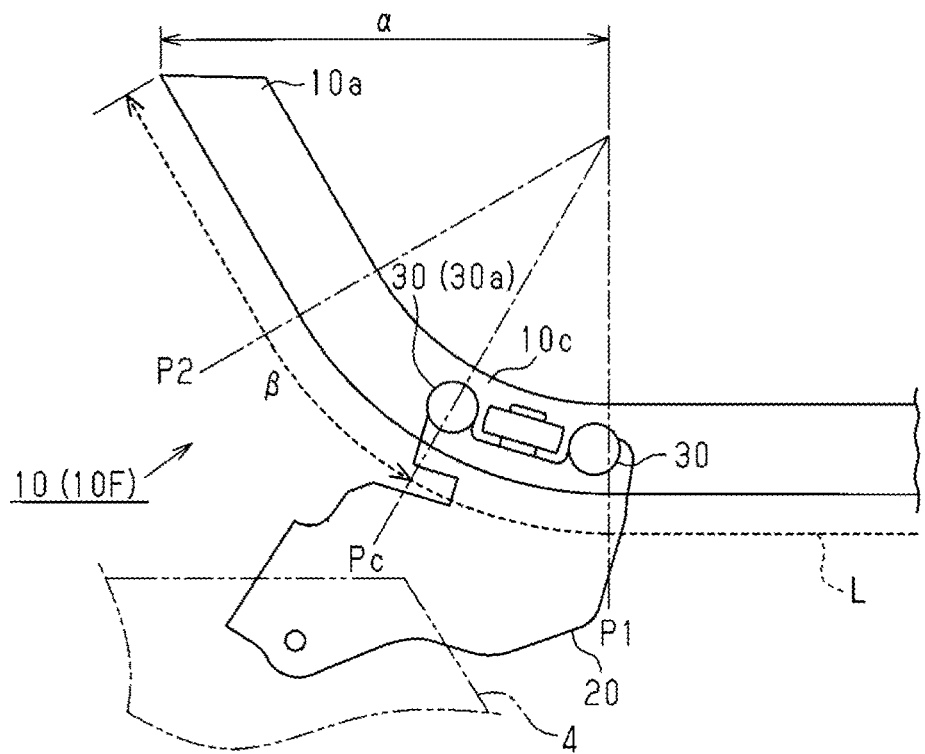
FIG. 12 is an explanatory view illustrating a specific range set in a curved portion of the guide rail.

Specifically, as illustrated in FIG. 12, the door ECU 55 of the present embodiment sets the specific range β, within which the braking control of the slide door 4 is executed, to correspond to the curved portion α of the guide rail 10, which is curved in the width direction of the vehicle, in the closing operation side end portion 10F as described above.

Specifically, in the guide rail 10 of the present embodiment, the corner portion 10c provided in the closing operation side end portion 10F takes the form of an arc, which is curved at a substantially constant radius of curvature from a first end P1 on the opening operation side to a second end P2 on the closing operation side. That is, the corner portion 10c deflects the sliding direction of the guide roller 30 engaged with the guide rail 10, that is, the movement path L of the slide door 4 inward of the width direction of the vehicle toward the closing operation direction of the slide door 4. Moreover, in the guide rail 10 of the present embodiment, the range from the second end P2 of the corner portion 10c to the closing operation side terminal 10a extends at a substantially constant deflection angle θ on the basis of the longitudinal direction of the vehicle (the transverse direction in FIG. 12). Thus, the door ECU 55 of the present embodiment is configured to set a specific range β, within which the guide rail 10 and the guide roller 30, more specifically, a closing operation side guide roller 30a, are engaged with each other on the closing operation side with respect to an intermediate position Pc of the corner portion 10c in the curved portion α of the guide rail 10 formed in the closing operation side end portion 10F.

Figure 13:
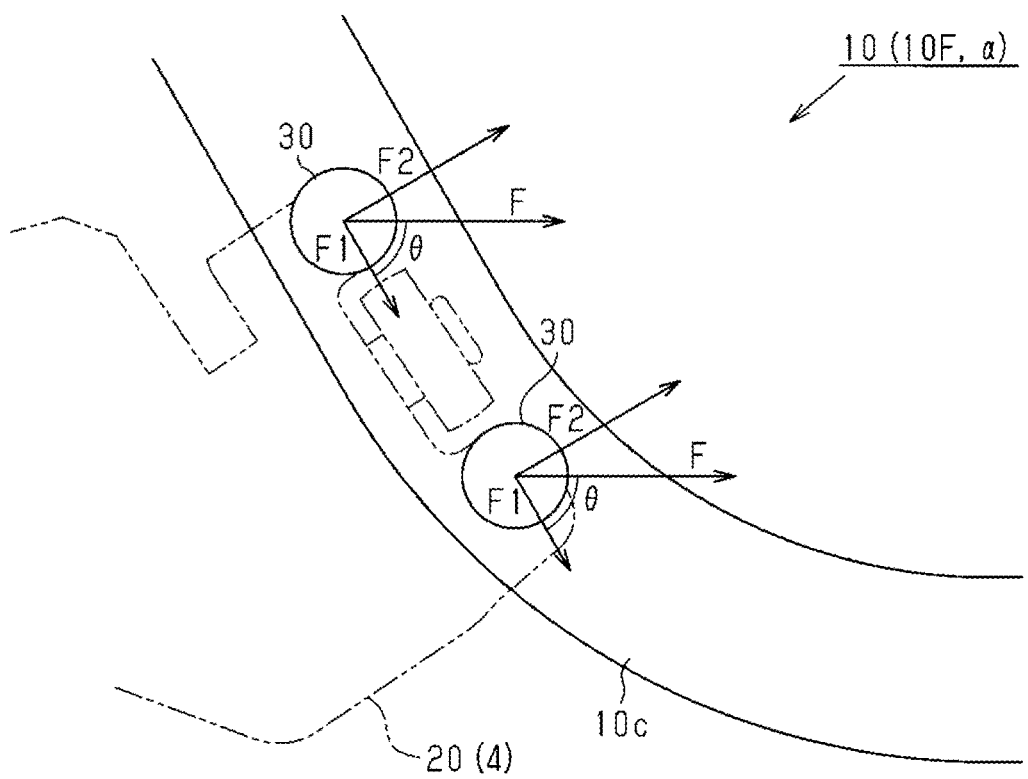
FIG. 13 is a view for explaining load acting on the guide roller based on a force for opening/closing the slide door.

That is, as illustrated in FIG. 13, for example, a force to open/close the slide door 4 such as, for example, an inertial force acting when the vehicle 1 accelerates or decelerates, acts in the longitudinal direction of the vehicle. Thus, load F in the longitudinal direction of the vehicle (the rear side in an example of FIG. 13) also acts on the guide rail 10 and the guide roller 30, which form the movement path L of the slide door 4.

However, at this time, when the guide roller 30 is engaged with the curved portion α of the guide rail 10, the load F acting on the guide roller 30 is decomposed into a first component F1 in a sliding direction of the guide roller 30 engaged with the guide rail 10 and a second component F2 in a rail width direction orthogonal to the first component F1. That is, the magnitude of braking load generated by applying the braking force to the moving slide door 4 during the traveling of the vehicle 1 has a value depending on the first component F1 of the load F acting on the guide roller 30. In addition, the magnitude of the first component F1 decreases as the deflection angle θ of the direction in which the guide roller 30 slides on the guide rail 10, that is, the deflection angle θ of the movement path L increases (F1=F× COS θ, θ≤90°).

Based on this, the door ECU 55 of the present embodiment sets the specific range β on the closing operation side with respect to the intermediate position Pc of the corner portion 10c which forms the curved portion α in the closing operation side end portion 10F of the guide rail 10, that is, in a range within which the deflection angle θ of the movement path L is larger. In addition, in the present embodiment, the specific range β also includes the opening/closing operation position X at which the slide door 4 becomes a closed state. In addition, the door ECU 55 is configured to execute the braking control during the traveling of the vehicle only when the slide door 4 is in the specific range β, so that the braking load when braking force is applied to the moving slide door 4 is constrained to be small.

(Record Holding of Full-Closing Abnormality and Reexamination)

Next, record holding of the full-closing abnormality and reexamination, which are executed by the door ECU 55 of the present embodiment, will be described.

Figure 14:
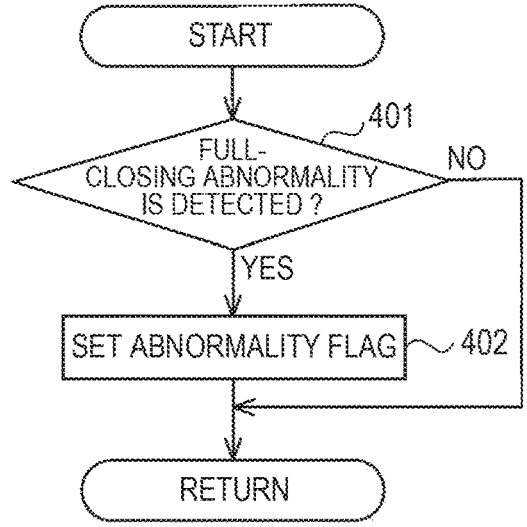
FIG. 14 is a flowchart illustrating a processing procedure when a detection record of a full-closing abnormality (abnormality flag) is held.

As illustrated in the flowchart of FIG. 14, when detecting occurrence of the full-closing abnormality in which the slide door 4 is not held in the fully-closed state during the traveling of the vehicle 1 (YES in step 401), the door ECU 55 of the present embodiment sets an abnormality flag indicating that the full-closing abnormality is detected (step 402).

Specifically, in the door ECU 55 of the present embodiment, the detection of the full-closing abnormality in step 401 includes detection of the engagement failure occurring in the latch mechanism 40 (see steps 101 to 103 in FIG. 9) and detection of the latch mechanism 40 being in the unlatched state during the traveling of the vehicle 1 (see steps 301 to 303 in FIG. 11). In addition, the door ECU 55 of the present embodiment holds a detection record Mfd of the full-closing abnormality, which corresponds to the abnormality flag, in a storage area 82. In addition, when the abnormality flag is set after the vehicle 1 stops, that is, when the detection record Mfd of the full-closing abnormality is held in the storage area 82, the door ECU 55 of the present embodiment applies the braking force to the slide door 4 by executing the braking control before the vehicle 1 travels, thereby holding the opening/closing operation position X.

Figure 15:
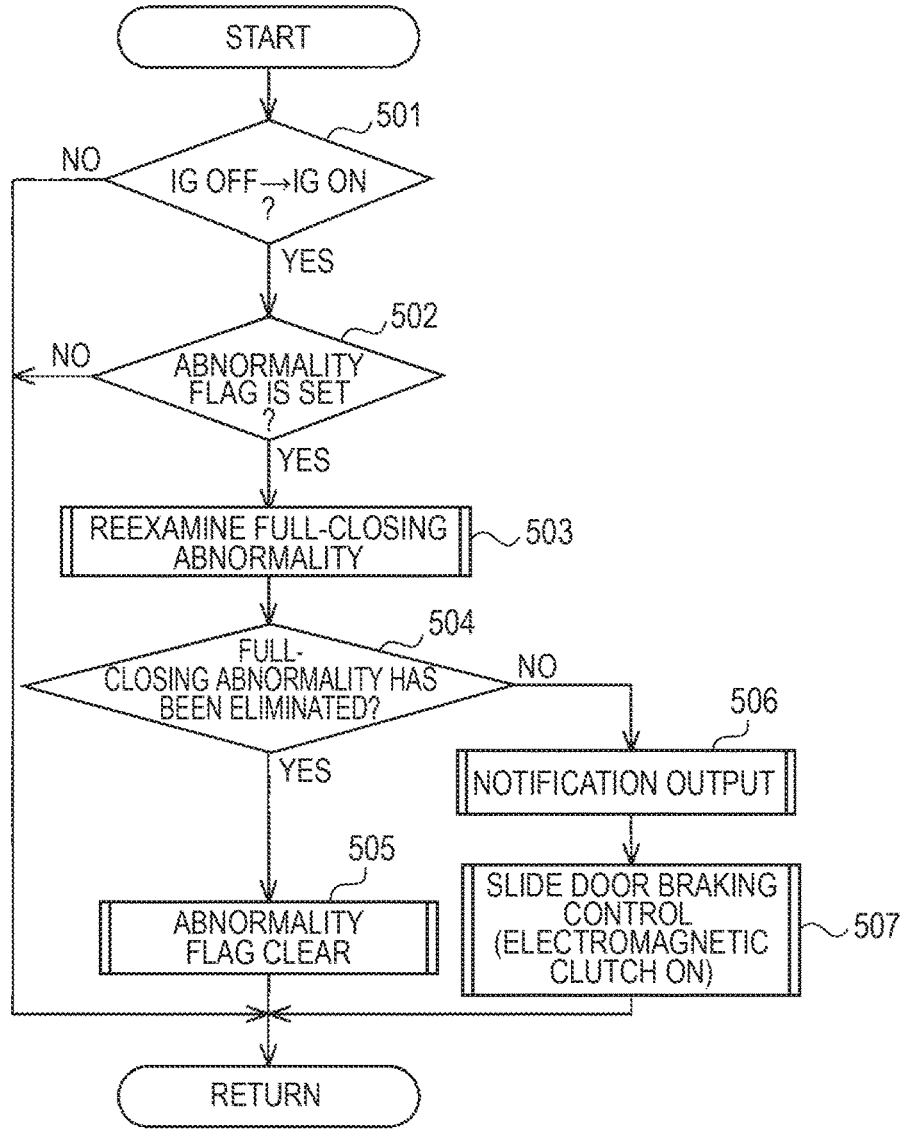
FIG. 15 is a flowchart illustrating a processing procedure when the braking control of the slide door is executed in a case where the detection record of the full-closing abnormality is held after the vehicle stops (when IG OFF→IG ON)

More specifically, as illustrated in the flowchart of FIG. 15, when detecting that the vehicle 1 has shifted from the non-activation state to an activation state based on the ignition signal Sig (IG OFF→IG ON, YES in step 501), the door ECU 55 of the present embodiment first determines whether or not the abnormality flag is set (step 502). In addition, when the abnormality flag is set (YES in step 502), the door ECU 55 reexamines the full-closing abnormality occurring in the slide door 4 (step 503).

Specifically, in the reexamination of the full-closing abnormality in step 503, the door ECU 55 of the present embodiment determines that the full-closing abnormality has been eliminated when the slide door 4 is at the opening/closing operation position X corresponding to the fully-closed state and the latch mechanism 40 is normally in the fully-latched state. In addition, when it is determined that the full-closing abnormality of the slide door 4 has been eliminated (YES in step 504), the door ECU 55 clears the abnormality flag, that is, erases the detection record Mfd of the full-closing abnormality held in the storage area 82 (step 505).

Meanwhile, when it is determined that the full-closing abnormality of the slide door 4 has not been eliminated even by the execution of the reexamination in step 504 (NO in step 504), the door ECU 55 first again executes notification output indicating that the full-closing abnormality has been detected (step 506). Subsequently, the door ECU 55 applies the braking force to the slide door 4 by turning on the electromagnetic clutch 53 of the door actuator 51 through the execution of the braking control, thereby holding the opening/closing operation position X (step 507).

In addition, as illustrated in the flowchart of FIG. 16, the door ECU 55 of the present embodiment frequently determines whether or not the vehicle 1 is in the stop state even when the vehicle 1 is in the activation state (at the time of IG ON) (step 601). In addition, the determination of the stop state in step 601 includes determining whether or not the occupant of the vehicle 1 can get in or out of the vehicle, for example, whether or not a parking brake is turned on. Further, when it is determined that the vehicle 1 is in the stop state (YES in step 601), the door ECU 55 determines whether or not the abnormality flag is set (step 602).

Next, when it is determined in step 602 that the abnormality flag is set (YES in step 602), the door ECU 55 of the present embodiment subsequently determines whether or not an operation input for causing the vehicle 1 to travel has been generated (step 603 to step 605).

Specifically, the door ECU 55 of the present embodiment determines whether or not the parking brake of the vehicle 1 is released based on the parking brake signal Spbk (step 603). In addition, the door ECU 55 determines whether or not a shift lever (not illustrated) of the vehicle 1 is at a traveling position, consequently, at a position other than a parking position (P range) based on the shift position signal Ssft (step 604). Moreover, the door ECU 55 determines whether or not a foot brake (not illustrated) of the vehicle 1 is turned off based on the brake signal Sbk (step 605). In addition, when all of these determination conditions are satisfied (YES in step 603, YES in step 604, and YES in step 605), the door ECU 55 of the present embodiment determines that the operation input for causing the vehicle 1 to travel has been generated.

The door ECU 55 of the present embodiment executes reexamination of the full-closing abnormality occurring in the slide door 4 even when, in the determination of the vehicle traveling operation input, it is determined that the operation input for causing the vehicle 1 to travel has been generated (step 606). In addition, when it is determined that the full-closing abnormality of the slide door 4 has been eliminated (YES in step 607), the door ECU 55 clears the abnormality flag (step 608). When it is determined that the full-closing abnormality has not been eliminated (NO in step 607), the door ECU 55 executes notification output indicating that the full-closing abnormality has not been eliminated (step 609), and executes the braking control of the slide door 4 (step 610).

That is, the door ECU 55 of the present embodiment terminates the braking control of the slide door 4 when the operation input of the user who intends to open/close the slide door 4 is generated after the vehicle 1 stops. In addition, even when the vehicle 1 shifts to the non-activation state (IG OFF) or when the braking control of the slide door 4 continues for a certain time, the door ECU 55 terminates the braking control of the slide door 4 (see FIG. 10).

Based on this, in a case where the full-closing abnormality of the slide door 4 has been detected before the vehicle 1 stops, as described above, the door ECU 55 of the present embodiment again executes the braking control of the slide door 4 before the vehicle 1 travels based on the detection record Mfd (abnormality flag) of the full-closing abnormality. Thus, the power slide door apparatus 60 of the present embodiment is configured to apply the braking force to the slide door 4 in advance so as to prevent the slide door 4 from being opened/closed during the traveling of the vehicle 1 when the stop vehicle 1 again travels.

In addition, for example, when the full-closing abnormality detected before the vehicle stops is merely that the slide door 4 is in the opening operation state during the traveling of the vehicle 1, the full-closing abnormality may be often eliminated (when the occupant performs a closing operation) by the stop of the vehicle 1. Based on this, as described above, the door ECU 55 of the present embodiment reexamines the full-closing abnormality of the slide door 4 before the vehicle 1 again travels after the vehicle has stopped. Thus, it is possible to more appropriately execute the braking control after the vehicle 1 stops.

As described above, according to the present embodiment, the following effects may be obtained.

(1) The door ECU 55, which serves as a traveling state determination unit 93a and an abnormality detection unit 93b, detects the occurrence of the full-closing abnormality in which the slide door 4 which is an opening/closing body, is not held in the fully-closed state by the latch mechanism 40 provided on the slide door 4 during the traveling of the vehicle 1 (see step 401 in FIG. 14). In addition, when the full-closing abnormality is detected, the door ECU 55, which serves as a braking control unit 93c, executes braking control for applying the braking force to the slide door 4 (see FIGS. 9 and 11). Moreover, the door ECU 55, which serves as a record holding unit 93d, holds the detection record Mfd (abnormality flag) of the full-closing abnormality occurring in the slide door 4 in the storage area 82 (see step 402 in FIG. 14). In addition, when the detection record Mfd of the full-closing abnormality is held (when the abnormality flag is set) after the vehicle 1 stops, the door ECU 55, which serves as the braking control unit 93c, executes the braking control for applying the braking force to the slide door 4 based on the detection record Mfd of the full-closing abnormality before the vehicle 1 travels (see FIGS. 15 and 16).

According to the above configuration, for example, even when the braking control of the slide door 4 is terminated after the vehicle 1 stops by, for example, shift to the non-activation state (IG OFF) or the operation input of the user who intends to open/close the slide door, the braking control of the slide door 4 is executed based on the detection record Mfd of the full-closing abnormality, which has been held before the vehicle 1 stops, before the vehicle 1 again travels. Thus, it is possible to prevent the slide door 4 from being opened during the traveling of the vehicle 1.

Particularly, in the case of the slide door 4, which is opened/closed in the longitudinal direction of the vehicle, the opening/closing direction thereof coincides with the vehicle traveling direction. That is, the slide door 4 is characterized by being easily opened/closed by inertia thereof when the vehicle 1 accelerates or decelerates. Therefore, a more remarkable effect can be obtained by adopting the above configuration.

(2) In a case where the detection record Mfd of the full-closing abnormality occurring in the slide door 4 is held after the vehicle 1 stops, the door ECU 55, which serves as a reexamination unit 93e, reexamines the full-closing abnormality of the slide door 4 before the vehicle 1 travels (step 503 and step 606). In addition, when it is determined that the full-closing abnormality of the slide door 4 has been eliminated via execution of the reexamination (YES in step 504 and YES in step 607), the door ECU 55, which serves as a record erasing unit 93f, erases the detection record Mfd of the full-closing abnormality (abnormality flag clear, step 505 and step 608).

That is, the full-closing abnormality of the slide door 4, detected before the stop of the vehicle, may be eliminated after the vehicle 1 stops, as, for example, in a case where the slide door 4 is simply in the opening operation state during the traveling of the vehicle 1. According to the above configuration, in such a case, it is possible to cause the braking control of the slide door 4 based on the detection record Mfd of the full-closing abnormality to be not performed. Thus, it is possible to more appropriately execute the braking control after the vehicle 1 stops.

(3) In a case where the vehicle 1 shifts from the non-activation state to the activation state (IG OFF→IG ON, YES in step 501), the door ECU 55, which serves as the braking control unit 93c, executes the braking control of the slide door 4 based on the detection record Mfd of the full-closing abnormality (step 507).

According to the above configuration, for example, when again traveling the vehicle 1 after the occupant leaves the vehicle 1 in which the full-closing abnormality of the slide door 4 has been detected before the vehicle stops, the braking control of the slide door 4 is executed as the occupant starts the vehicle 1 (IG ON). Thus, it is possible to prevent the slide door 4 from being opened during the traveling of the vehicle 1.

(4) In a case where the operation input for causing the vehicle 1 to travel is generated after the vehicle 1 stops (YES in all of steps 603 to 605), the door ECU 55, which serves as the braking control unit 93c, executes the braking control of the slide door 4 (step 610).

According to the above configuration, for example, even in a case where the braking control of the slide door 4 has terminated after the stop of the vehicle 1 in which the full-closing abnormality of the slide door 4 has been detected, the braking control of the slide door 4 is executed as the occupant performs the operation input for causing the vehicle 1 to travel. Thus, it is possible to prevent the slide door 4 from being opened during the traveling of the vehicle 1.

(5) In a case where a failure occurs in the latch mechanism 40 provided in the slide door 4, the door ECU 55, which serves as the abnormality detection unit 93b, determines that the full-closing abnormality of the slide door 4 is detected (see step 101 to step 103 in FIG. 9).

That is, there is a possibility that the slide door 4 could not be held in the fully-closed state in a state where the latch mechanism 40 has failed. Therefore, according to the above configuration, it is possible to appropriately detect the full-closing abnormality of the slide door 4 and execute the braking control thereof.

(6) When the slide door 4 is in the opening operation state during the traveling of the vehicle 1, the door ECU 55, which serves as the abnormality detection unit 93b, determines that the full-closing abnormality of the slide door is detected (see step 301 to step 303 in FIG. 11).

That is, the slide door 4 may be held on the vehicle body 2 in the fully-closed state during the traveling of the vehicle 1. Therefore, according to the above configuration, it is possible to appropriately detect the full-closing abnormality of the slide door 4 and execute the braking control thereof.

(7) The door ECU 55, which serves as a notification output unit 94, executes notification output using the notification device 81 such as, for example, a speaker or a warning lamp when detecting the full-closing abnormality of the slide door 4. Thus, it is possible to notify the occupant of the vehicle 1 of the occurrence of the engagement failure in the latch mechanism 40 of the slide door 4.

(8) The slide door 4 is opened/closed when driven by the door actuator 51, which uses the motor 50 as a drive source. Moreover, the electromagnetic clutch 53, which serves as a clutch mechanism, is provided in the transmission path of the drive force to the slide door 4. In addition, the door ECU 55, which serves as the braking control unit 91c, executes the braking control by bringing the electromagnetic clutch 53 into a connection state in a state where the motor 50 of the door actuator 51 stops.

According to the above configuration, it is possible to apply the braking force to the slide door 4 based on, for example, the cogging torque of the stopped motor 50 or the frictional force of the decelerating mechanism. Thus, it is possible to promptly execute the braking control with a simplified configuration.

(9) The door ECU 55, which serves as a failure detection unit 91a, detects the occurrence of the engagement failure, in which the latch mechanism 40 cannot hold the slide door 4, which is an opening/closing body, in the fully-closed state, based on the ON and OFF states of the pawl switch 65 provided in the latch mechanism 40 of the slide door 4. In addition, when the engagement failure of the latch mechanism 40 is detected in a case where the slide door 4 is in the fully-closed state, the door ECU 55, which serves as a full-closing detection unit 91b and a braking control unit 91c, executes braking control to apply the braking force to the slide door 4.

According to the above configuration, when the engagement failure occurs in the latch mechanism 40 of the slide door 4, the braking control is executed before the slide door 4 is opened. Thus, it is possible to more reliably prevent the slide door 4 from being opened from the fully-closed state during the traveling of the vehicle 1.

(10) After it is detected that the slide door 4 is in the fully-closed state (see YES in step 101 of FIG. 9), the door ECU 55, which serves as the failure detection unit 91a, determines whether or not a state where the pawl 73 of the latch mechanism 40 is disengaged from the latch 72 is continued (in ON-fixation) based on the ON and OFF states of the pawl switch 65 (step 102). In addition, when it is determined that the pawl 73 is in ON-fixation (YES in step 102), the door ECU 55 determines that the engagement failure has occurred in the latch mechanism 40 (step 103).

That is, when the latch 72 rotates from the half-latched position to the fully-latched position, the pawl 73 of the latch mechanism 40 first rotates in the disengagement direction so as to be pushed by the latch 72, and then again rotates in the engagement direction. In addition, the pawl switch 65 is switched between the ON state and the OFF state in conjunction with the reciprocal rotation of the pawl 73. That is, when the pawl switch 65 is in ON-fixation, it is considered that the pawl 73 is disengaged from the latch 72, and consequently, that the latch mechanism 40 cannot hold the slide door 4 in the fully-closed state. Therefore, according to the above configuration, it is possible to accurately detect the full-closing abnormality occurring in the slide door 4.

(11) In the case where the ON and OFF states of the full latch switch 64 provided in the latch mechanism 40 are switched, the door ECU 55, which serves as the failure detection unit 91a, executes determination of detection of the engagement failure.

That is, the full latch switch 64 is typically configured to be switched between the ON state and the OFF state at the timing when the latch mechanism 40 restrains the slide door 4 to the vehicle body 2, that is, when the slide door 4 becomes the fully-closed state. Therefore, according to the above configuration, when the slide door 4 becomes the fully-closed state, it is possible to promptly detect the engagement failure of the latch mechanism 40 and execute the braking control. Thus, it is possible to more reliably prevent the slide door 4 from being opened from the fully-closed state during the traveling of the vehicle 1.

(12) The slide door 4 is opened/closed along the movement path L formed by the guide rail 10, which extends in the longitudinal direction of the vehicle, and the guide roller 30, which is engaged with the guide rail 10. In addition, the guide rail 10 has the curved portion α, which is curved in the width direction of the vehicle, in the closing operation side end portion 10F, which is disposed in the closing operation direction of the slide door 4. In addition, the door ECU 55, which serves as a position detection unit 92a, a traveling state determination unit 92b, and a braking controller 92c, executes the braking control for applying the braking force to the slide door 4 when the opening/closing operation position X of the slide door is within the specific range β, which is set in the movement path L of the slide door 4 to correspond to the curved portion α of the guide rail 10 during the traveling of the vehicle 1.

That is, in a case where the guide roller 30 is engaged with the curved portion α of the guide rail 10, for example, the load F, which acts on the guide roller 30 based on a force to open/close the slide door 4 such as, for example, an inertial force acting when the vehicle 1 is accelerated or decelerated, is decomposed into the first component F1 in the sliding direction of the guide roller 30 and the second component F2 in the rail width direction. In addition, the magnitude of braking load generated by applying the braking force to the moving slide door 4 during the traveling of the vehicle 1 has a value depending on the first component F1 of the load F acting on the guide roller 30.

Therefore, according to the above configuration, it is possible to reduce the braking load when the braking force is applied to the slide door 4 during the traveling of the vehicle. In addition, since the guide rail 10 receives the second component F2 of the load F acting on the guide roller 30 based on the force to open/close the slide door 4, the guide roller 30 is hardly swung in the rail width direction when the braking force is applied to the slide door 4. Thus, it is possible to prevent the guide roller 30 from colliding with the guide rail 10. As a result, it is possible to realize high reliability and excellent durability.

(13) The curved portion α of the guide rail 10 includes the corner portion 10c, which deflects the movement path L of the slide door 4 inward in the width direction of the vehicle toward the closing operation direction of the slide door 4. In addition, the door ECU 55, which serves as the braking controller 92c, sets a specific range β, within which the guide rail 10 and the guide roller 30 are engaged with each other on the closing operation side with respect to the intermediate position of the corner portion 10c, and executes the braking control of the slide door 4 within the specific range β.

That is, the first component F1 of the load F, which acts on the guide roller 30 based on the force to open/close the slide door 4, decreases as the deflection angle θ of the generation direction thereof in which the guide roller 30 slides on the guide rail 10, that is, the deflection angle θ of the movement path L increases. In many cases, the deflection angle θ is set to a larger value in the closing operation side with respect to the intermediate position Pc of the corner portion 10c which forms the curved portion α in the closing operation side end portion 10F of the guide rail 10. Therefore, according to the above configuration, it is possible to more effectively reduce the braking load when the braking force is applied to the slide door 4 during the traveling of the vehicle.

In addition, the above embodiment may be modified as follows.

In the above embodiment, this disclosure is embodied in the power slide door apparatus 60 that opens/closes the slide door 4 as an opening/closing body provided on the side surface 2s of the vehicle 1 by motor driving. However, this disclosure is not limited thereto, and may be applied to a vehicular opening/closing body control device targeting an opening/closing body other than the slide door, as long as the opening/closing body is configured to be restrained to the vehicle body 2 in the fully-closed state by the latch mechanism 40 during the traveling of the vehicle 1.

In the above embodiment, in the case where the pawl switch 65 is switched from the OFF state to the ON state and then the full latch switch 64 is switched from the ON state to the OFF state, it is determined that the engagement failure has occurred in the latch mechanism 40 when the pawl switch 65 remains in the ON state (ON-fixation) for the predetermined time t1 or longer (see FIG. 8). However, this disclosure is not limited thereto, and the timing for determining the engagement failure of the latch mechanism 40 may be arbitrarily changed. For example, there may be a configuration in which whether or not the slide door 4 is in the fully-closed state is determined at the opening/closing operation position X. In addition, determination of ON-fixation of the pawl switch 65 may not be necessarily based on the timing when the ON and OFF states of the full latch switch 64 are switched.

The mode of holding the detection record Mfd of the full-closing abnormality corresponding to the abnormality flag in the storage area 82 may be a bit ON/OFF or a detailed information record.

The determination conditions for the traveling state and the stop state of the vehicle 1 may be arbitrarily set.

In the above embodiment, the slide door 4 is driven by the door actuator 51, which uses the motor 50 as a drive source. In addition, the electromagnetic clutch 53 capable of connecting/disconnecting the transmission path of the drive force to/from the slide door 4 is provided in the door actuator 51. In addition, the braking control of the slide door 4 is performed by turning on the electromagnetic clutch 53 in the state where the motor 50 of the door actuator 51 stops.

However, this disclosure is not limited thereto, and there may be a configuration using a clutch mechanism other than the electromagnetic clutch 53, for example, a mechanical or hydraulic clutch mechanism, as long as the braking force to the slide door 4 can be applied by bringing the transmission path of the drive force into a connection state. In addition, for example, in the case where such a clutch mechanism is not provided, there may be a configuration in which the braking force is applied to the slide door 4 by the control of the motor 50, which is a drive source. Moreover, the motor control method for generating the braking force may be regenerative brake control, or may be phase-fixed energization (one-phase energization) in which an energization phase is fixed. In addition, a configuration in which a brake device for executing the braking control is provided in the slide door 4 is also not excluded.

In the above embodiment, the range, within which the guide rail 10 and the guide roller 30, more specifically, the closing operation side guide roller 30a are engaged with each other on the closing operation side with respect to the intermediate position Pc of the corner portion 10c constituting the curved portion α of the guide rail 10, is set as the specific range β within which the braking control of the slide door 4 is executed during the traveling of the vehicle. However, this disclosure is not limited thereto, and the specific range β may be arbitrarily set as long as it is a range within which at least one guide roller 30 is engaged with the curved portion α of the guide rail 10.

In the above embodiment, when parking brake release, shift lever traveling position, and foot brake OFF are detected (YES in all of steps 603 to 605), it is determined that an operation input for causing the vehicle 1 to travel has occurred, and the reexamination of the full-closing abnormality (step 606) and the braking control of the slide door 4 (step 610) are executed. However, this disclosure is not limited thereto, and the conditions for determining the operation input for causing the vehicle 1 to travel may be arbitrarily set, for example, by combining one or more of the conditions or other conditions. In addition, the timing of reexamining the full-closing abnormality may be arbitrarily set regardless of the operation input for causing the vehicle 1 to travel.

In the above embodiment, the full-closing abnormality of the slide door 4 includes the engagement failure of the latch mechanism 40 detected based on the ON-fixation of the pawl switch 65, but there may be a configuration in which the full-closing abnormality includes a failure of the latch mechanism 40 detected based on the ON and OFF states of the half latch switch 63 and the full latch switch 64. In addition, for example, there may be a configuration in which the full-closing abnormality of the slide door 4 does not include a case where the slide door 4 is merely in the opening operation state (the latch mechanism 40 is in the unlatched state) during the traveling of the vehicle 1.

In the above embodiment, after the vehicle 1 has stopped, in a case where any condition, among the occurrence of the operation input of the user who intends to open/close the slide door 4, shift to the non-activation state (IG OFF), and the continuance of the braking control for a certain time, is satisfied, the braking control of the slide door 4 is terminated. However, this disclosure is not limited thereto, and a condition of terminating the braking control may be arbitrarily set. In addition, for example, there may be a configuration in which the braking control of the slide door 4 is not executed in a case where the quantity of vehicle state such as, for example, the vehicle speed V, or the control signals (e.g., Sig, Spbk, Ssft and Sbk) of the vehicle 1 cannot be obtained (e.g., bus OFF).

In the above embodiment, the notification output using the notification device 81 such as, for example, a speaker or a warning lamp is executed in accordance with the braking control of the slide door 4, but there may be a configuration in which such a notification output is not performed.

In the above embodiment, the activation state/non-activation state of the vehicle 1 is determined based on the ignition signal Sig (IG ON/IG OFF), but, for example, there may be a configuration in which the activation state/non-activation state of the vehicle 1 is determined using other signals in a case of, for example, an electric vehicle.

In the above embodiment, the slide door 4 is closed by movement toward the vehicle front side thereof and is opened by movement toward the vehicle rear side thereof. However, this disclosure is not limited to such a so-called rear-opening-type opening/closing body, and may be embodied in a so-called front-opening-type opening/closing body that is opened by movement toward the vehicle front side thereof and is closed by movement toward the vehicle rear side thereof. In addition, there may be a configuration in which the guide rail 10 is provided on the slide door 4 side.

Next, technical ideas that may be grasped from the above embodiment will be described with effects.

(A) In a vehicular opening/closing body control device, the opening/closing body is a slide door that is opened/closed in the longitudinal direction of the vehicle. That is, in the case of the slide door that is opened/closed in the longitudinal direction of the vehicle, the opening/closing operation direction thereof coincides with the traveling direction of the vehicle. That is, the slide door has a characteristic of being easily opened/closed by inertia thereof when a vehicle accelerates or decelerates. Therefore, a more remarkable effect can be obtained by adopting the above configuration.

(B) The vehicular opening/closing body control device includes a full-closing detection unit configured to detect that the opening/closing body is in a fully-closed state, and a failure detection unit configured to detect a failure of a latch mechanism provided on the opening/closing body, the latch mechanism is provided with a pawl switch, which is switched between ON and OFF states in conjunction with an operation of a pawl, which is engaged with a latch so as to hold a state where the latch is engaged with a striker, the failure detection unit detects occurrence of an engagement failure in which the latch mechanism fails to hold the opening/closing body in the fully-closed state based on the ON and OFF states of the pawl switch, and, in a case where the opening/closing body is in the fully-closed state, the braking control unit executes braking control for applying the braking force to the opening/closing body when the engagement failure is detected in the latch.

According to the above configuration, when the engagement failure occurs in the latch mechanism of the opening/closing body, the braking control is executed before the opening/closing body is opened. Thus, it is possible to more reliably prevent the opening/closing body from being opened from the fully-closed state during the traveling of the vehicle.

(C) In the vehicular opening/closing body control device, the failure detection unit may determine that the engagement failure has occurred in the latch mechanism when it is determined that a state where the pawl is disengaged from the latch is continued based on the ON and OFF states of the pawl switch after it is detected that the opening/closing body is in the fully-closed state.

That is, when the latch rotates from a half-latched position to a fully-latched position, the pawl of the latch mechanism first rotates in a disengagement direction so as to be pressed by the latch, and then rotates again in an engagement direction. In addition, the pawl switch is switched between the ON and OFF states in conjunction with reciprocal rotation of the pawl. That is, based on the ON and OFF states (e.g., ON-fixation) of the pawl switch, it is possible to detect a state where the pawl is disengaged from the latch, and consequently, a state where the latch mechanism cannot hold the opening/closing body in the fully-closed state. Therefore, according to the above configuration, it is possible to accurately detect full-closing abnormality occurring in the opening/closing body.

(D) In the vehicular opening/closing body control device, the latch mechanism is provided with a full latch switch, which is switched between ON and OFF states as the latch rotates to a position corresponding to the fully-latched state, and the failure detection unit executes determination of detection of the engagement failure for the latch mechanism when the ON and OFF states of the full latch switch are switched.

That is, the full latch switch is configured to be switched between the ON and OFF states at a timing when the latch mechanism is in a state capable of restraining the opening/closing body to a vehicle body, that is, when the opening/closing body becomes the fully-closed state. Therefore, according to the above configuration, it is possible to promptly detect the engagement failure of the latch mechanism and execute the braking control when the opening/closing body becomes the fully-closed state. Thus, it is possible to more reliably prevent the opening/closing body from being opened from the fully-closed state during the traveling of the vehicle.

(E) The vehicular opening/closing body control device includes a position detection unit, which detects an opening/closing operation position of the opening/closing body, and a traveling state determination unit, which determines the traveling state of the vehicle. The opening/closing body is opened/closed along a movement path, formed by a guide rail, which extends in the longitudinal direction of the vehicle, and a guide roller, which is engaged with the guide rail, and the guide rail has a curved portion, which is curved in the width direction of the vehicle, in the closing operation side end portion, which is disposed in the closing operation direction of the opening/closing body. The braking controller executes braking control for applying a braking force to the opening/closing body in a case where the opening/closing operation position of the opening/closing body is within a specific range, which is set in the movement path of the opening/closing body to correspond to the curved portion of the guide rail during the traveling of the vehicle.

That is, in the case where the guide roller is engaged with the curved portion of the guide rail, for example, a load acting on the guide roller based on a force to open/close the opening/closing body such as, for example, an inertial force acting when the vehicle accelerates or decelerates is decomposed into a first component in a sliding direction of the guide roller and a second component in a rail width direction. In addition, the magnitude of the braking load generated by applying the braking force to the moving opening/closing body during the traveling of the vehicle has a value obtained according to the first component of the load acting on the guide roller based on the force to open/close the opening/closing body.

Therefore, according to the above configuration, it is possible to reduce the braking load when the braking force is applied to the opening/closing body during the traveling of the vehicle. In addition, since the guide rail receives the second component of the load acting on the guide roller based on the force to open/close the opening/closing body, the guide roller is hardly swung in the rail width direction when the braking force is applied to the opening/closing body. Further, it is possible to prevent the guide roller from colliding with the guide rail. As a result, it is possible to realize high reliability and excellent durability.

(F) In the vehicular opening/closing body control device, the curved portion includes a corner portion, which deflects the movement path of the opening/closing body inward in the width direction of the vehicle toward the closing operation direction of the opening/closing body, and the braking controller sets a specific range, within which the guide rail and the guide roller are engaged with each other on the closing operation side with respect to the intermediate position of the corner portion, and executes the braking control within the specific range.

That is, the first component of the load acting on the guide roller based on the force to open/close the opening/closing body decreases as the deflection angle of the generation direction of the first component in which the guide roller slides on the guide rail, consequently, the deflection angle of the movement path increases. In addition, in many cases, the deflection angle is set to a larger value on the closing operation side with respect to the intermediate position of the corner portion, which forms the curved portion in the closing operation side end portion of the guide rail. Therefore, according to the above configuration, it is possible to more effectively reduce the braking load when the braking force is applied to the opening/closing body during the traveling of the vehicle.

A vehicular opening/closing body control device according to an aspect of this disclosure includes: a braking control unit configured to apply a braking force to an opening/closing body provided in an opening in a vehicle; a traveling state determination unit configured to determine a traveling state of the vehicle; an abnormality detection unit configured to detect occurrence of a full-closing abnormality in which the opening/closing body is not held in a fully-closed state by a latch mechanism provided on the opening/closing body during the traveling of the vehicle; and a record holding unit configured to hold a detection record of the full-closing abnormality, wherein the braking control unit executes braking control for applying a braking force to the opening/closing body through detection of the full-closing abnormality of the opening/closing body, and in a case where the detection record of the full-closing abnormality is held after the vehicle stops, executes the braking control of the opening/closing body based on the detection record of the full-closing abnormality before the vehicle travels.

According to the above configuration, for example, even when the braking control of the opening/closing body is terminated after the vehicle stops by, for example, shift to a non-activation state (IG OFF) or an operation input of a user who intends to open/close the opening/closing body, the braking control of the opening/closing body is executed based on the detection record of the full-closing abnormality, which has been held before the vehicle again travels. Thus, it is possible to prevent the opening/closing body from being opened during the traveling of the vehicle.

It is preferable that the vehicular opening/closing body control device according to the aspect of this disclosure further includes: a reexamination unit configured to reexamine the full-closing abnormality of the opening/closing body before the vehicle travels in a case where the detection record of the full-closing abnormality is held after the vehicle stops; and a record erasing unit configured to erase the detection record of the full-closing abnormality when it is determined that the full-closing abnormality of the opening/closing body has been eliminated via execution of the re-examination.

That is, for example, the full-closing abnormality of the opening/closing body, detected before the stop of the vehicle, may be eliminated after the vehicle stops, as, for example, in a case where the opening/closing body is simply in an opening operation state during the traveling of the vehicle. According to the above configuration, in such a case, it is possible to cause the braking control of the opening/closing body based on the detection record of the full-closing abnormality to be not performed. Thus, it is possible to more appropriately execute the braking control after the vehicle stops.

In the vehicular opening/closing body control device according to the aspect of this disclosure, it is preferable that the braking control unit executes the braking control of the opening/closing body based on the detection record of the full-closing abnormality in a case where the vehicle shifts from a non-activation state to an activation state.

According to the above configuration, for example, when again traveling the vehicle after an occupant leaves the vehicle in which the full-closing abnormality of the opening/closing body has been detected before the vehicle stops, the braking control of the opening/closing body is executed as the occupant starts the vehicle (IG ON). Thus, it is possible to prevent the opening/closing body from being opened during the traveling of the vehicle.

In the vehicular opening/closing body control device according to the aspect of this disclosure, it is preferable that the braking control unit executes the braking control of the opening/closing body based on the detection record of the full-closing abnormality in a case where an operation input for causing the vehicle to travel is generated after the vehicle stops.

According to the above configuration, for example, even in a case where the braking control of the opening/closing body has terminated after the stop of the vehicle in which the full-closing abnormality of the opening/closing body has been detected, the braking control of the opening/closing body is executed as the occupant performs the operation input for causing the vehicle to travel. Thus, it is possible to prevent the opening/closing body from being opened during the traveling of the vehicle.

In the vehicular opening/closing body control device according to the aspect of this disclosure, it is preferable that the abnormality detection unit determines that the full-closing abnormality of the opening/closing body is detected in a case where a failure occurs in the latch mechanism provided on the opening/closing body.

That is, there is a possibility that the opening/closing body could not be held in the fully-closed state in a state where the latch mechanism has failed. Therefore, according to the above configuration, it is possible to appropriately detect the full-closing abnormality of the opening/closing body and execute the braking control thereof.

In the vehicular opening/closing body control device according to the aspect of this disclosure, it is preferable that the abnormality detection unit determines that the full-closing abnormality of the opening/closing body is detected in a case where the opening/closing body is in the opening operation state during the traveling of the vehicle.

That is, it is desirable that the opening/closing body is held in the fully-closed state on the vehicle body during the traveling of the vehicle. Therefore, according to the above configuration, it is possible to appropriately detect the full-closing abnormality of the opening/closing body and execute the braking control thereof.

It is preferable that the vehicular opening/closing body control device according to the aspect of this disclosure further includes a notification output unit configured to execute notification output in a case where the full-closing abnormality of the opening/closing body is detected.

According to the above configuration, it is possible to notify an occupant of the vehicle of the occurrence of the engagement failure in the latch mechanism of the opening/closing body.

In the vehicular opening/closing body control device according to the aspect of this disclosure, it is preferable that the opening/closing body is opened/closed when driven by an actuator, which uses a motor as a drive source, a clutch mechanism is provided on a transmission path of a drive force to the opening/closing body, and the braking controller executes the braking control by bringing the clutch mechanism into a connection state in a state where the motor stops.

According to the above configuration, it is possible to apply the braking force to the opening/closing body based on, for example, the cogging torque of the stopped motor or the friction force of a deceleration mechanism. Thus, it is possible to promptly execute the braking control with a simplified configuration.

In the vehicular opening/closing body control device according to the aspect of this disclosure, it is preferable that the opening/closing body is a slide door that is opened/closed in the longitudinal direction of the vehicle. That is, in the case of the slide door that is opened/closed in the longitudinal direction of the vehicle, the opening/closing operation direction thereof coincides with the traveling direction of the vehicle. That is, the slide door has a characteristic of being easily opened/closed by inertia thereof when a vehicle accelerates or decelerates. Therefore, a more remarkable effect can be obtained by adopting the above configuration.

It is preferable that the vehicular opening/closing body control device according to the aspect of this disclosure further includes: a full-closing detection unit configured to detect that the opening/closing body is in a fully-closed state; and a failure detection unit configured to detect a failure of a latch mechanism provided on the opening/closing body. It is preferable that the latch mechanism is provided with a pawl switch, which is switched between ON and OFF states in conjunction with an operation of a pawl, which is engaged with a latch so as to hold a state where the latch is engaged with a striker, and the failure detection unit detects occurrence of an engagement failure in which the latch mechanism fails to hold the opening/closing body in the fully-closed state based on the ON and OFF states of the pawl switch, and, in a case where the opening/closing body is in the fully-closed state, the braking control unit executes braking control for applying the braking force to the opening/closing body when the engagement failure is detected in the latch.

According to the above configuration, when the engagement failure occurs in the latch mechanism of the opening/closing body, the braking control is executed before the opening/closing body is opened. Thus, it is possible to more reliably prevent the opening/closing body from being opened from the fully-closed state during the traveling of the vehicle.

In the vehicular opening/closing body control device according to the aspect of this disclosure, it is preferable that the failure detection unit determines that the engagement failure has occurred in the latch mechanism when it is determined, based on the ON and OFF states of the pawl switch, that a state where the pawl is disengaged from the latch is continued after it is detected that the opening/closing body is in the fully-closed state. That is, when the latch rotates from a half-latched position to a fully-latched position, the pawl of the latch mechanism first rotates in a disengagement direction so as to be pressed by the latch, and then rotates again in an engagement direction. In addition, the pawl switch is switched between the ON and OFF states in conjunction with reciprocal rotation of the pawl. That is, based on the ON and OFF states (e.g., ON-fixation) of the pawl switch, it is possible to detect a state where the pawl is disengaged from the latch, and consequently, a state where the latch mechanism cannot hold the opening/closing body in the fully-closed state.

Therefore, according to the above configuration, it is possible to accurately detect full-closing abnormality occurring in the opening/closing body.

In the vehicular opening/closing body control device according to the aspect of this disclosure, it is preferable that the latch mechanism is provided with a full latch switch, which is switched between ON and OFF states as the latch rotates to a position corresponding to the fully-latched state, and the failure detection unit executes determination of detection of the engagement failure for the latch mechanism when the ON and OFF states of the full latch switch are switched. That is, the full latch switch is generally configured to be switched between the ON and OFF states at a timing when the latch mechanism is in a state capable of restraining the opening/closing body to a vehicle body, that is, when the opening/closing body becomes the fully-closed state.

Therefore, according to the above configuration, it is possible to promptly detect the engagement failure of the latch mechanism and execute the braking control when the opening/closing body becomes the fully-closed state. Thus, it is possible to more reliably prevent the opening/closing body from being opened from the fully-closed state during the traveling of the vehicle.

It is preferable that the vehicular opening/closing body control device according to the aspect of this disclosure further includes: a position detection unit configured to detect an opening/closing operation position of the opening/closing body; and a traveling state determination unit configured to determine the traveling state of the vehicle. It is preferable that the opening/closing body is opened/closed along a movement path, formed by a guide rail, which extends in the longitudinal direction of the vehicle, and a guide roller, which is engaged with the guide rail, and the guide rail has a curved portion, which is curved in the width direction of the vehicle, in the closing operation side end portion, which is disposed in the closing operation direction of the opening/closing body. It is preferable that the braking controller executes braking control for applying a braking force to the opening/closing body in a case where the opening/closing operation position of the opening/closing body is within a specific range, which is set in the movement path of the opening/closing body to correspond to the curved portion of the guide rail during the traveling of the vehicle. That is, in the case where the guide roller is engaged with the curved portion of the guide rail, for example, a load acting on the guide roller based on a force to open/close the opening/closing body such as, for example, an inertial force acting when the vehicle accelerates or decelerates is decomposed into a first component in a sliding direction of the guide roller and a second component in a rail width direction. In addition, the magnitude of the braking load generated by applying the braking force to the moving opening/closing body during the traveling of the vehicle has a value obtained according to the first component of the load acting on the guide roller based on the force to open/close the opening/closing body.

Therefore, according to the above configuration, it is possible to reduce the braking load when the braking force is applied to the opening/closing body during the traveling of the vehicle. In addition, since the guide rail receives the second component of the load acting on the guide roller based on the force to open/close the opening/closing body, the guide roller is hardly swung in the rail width direction when the braking force is applied to the opening/closing body. Further, it is possible to prevent the guide roller from colliding with the guide rail. As a result, it is possible to realize high reliability and excellent durability.

In the vehicular opening/closing body control device according to the aspect of this disclosure, it is preferable that the curved portion includes a corner portion, which deflects the movement path of the opening/closing body inward in the width direction of the vehicle toward the closing operation direction of the opening/closing body, and the braking controller sets a specific range, within which the guide rail and the guide roller are engaged with each other on the closing operation side with respect to an intermediate position of the corner portion, and executes the braking control within the specific range. That is, the first component of the load acting on the guide roller based on the force to open/close the opening/closing body decreases as the deflection angle of the generation direction of the first component in which the guide roller slides on the guide rail, consequently, the deflection angle of the movement path increases. In addition, in many cases, the deflection angle is set to a larger value on the closing operation side with respect to the intermediate position of the corner portion, which forms the curved portion in the closing operation side end portion of the guide rail.

Therefore, according to the above configuration, it is possible to more effectively reduce the braking load when the braking force is applied to the opening/closing body during the traveling of the vehicle.

According to this disclosure, it is possible to prevent an opening/closing body, which has been in a fully-closed state, from being opened when a vehicle again travels after stopped.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicular opening/closing body control device comprising: an electronic control unit configured to
apply a braking force to an opening/closing body provided in an opening in a vehicle;
determine a traveling state of the vehicle;
detect occurrence of a full-closing abnormality in which the opening/closing body is not held in a fully-closed state by a latch mechanism provided on the opening/closing body during the traveling of the vehicle;
hold a detection record of the full-closing abnormality;
execute braking control for applying a braking force to the opening/closing body based on the detection of the full-closing abnormality of the opening/closing body;
reexamine the full-closing abnormality of the opening/closing body in a case where the detection record of the full-closing abnormality is held after a stop of the vehicle, and if the full-closing abnormality is eliminated erase the detection record; and
execute the braking control of the opening/closing body based on the detection record of the full-closing abnormality before the vehicle travels from the stop of the vehicle.

2. The vehicular opening/closing body control device according to claim 1,
wherein the electronic control unit executes the braking control of the opening/closing body based on the detection record of the full-closing abnormality in a case where the vehicle shifts from a non-activation state to an activation state.

3. The vehicular opening/closing body control device according to claim 1,
wherein the electronic control unit executes the braking control of the opening/closing body based on the detection record of the full-closing abnormality in a case where an operation input for causing the vehicle to travel is generated after the vehicle stops.

4. The vehicular opening/closing body control device according to claim 1,
wherein the electronic control unit determines that the full-closing abnormality of the opening/closing body is detected in a case where a failure occurs in the latch mechanism provided on the opening/closing body.

5. The vehicular opening/closing body control device according to claim 1,
wherein the electronic control unit determines that the full-closing abnormality of the opening/closing body is detected in a case where the opening/closing body is in an opening operation state during the traveling of the vehicle.

6. The vehicular opening/closing body control device according to claim 1,
wherein the electronic control unit is configured to execute notification output in a case where the full-closing abnormality of the opening/closing body is detected.

7. The vehicular opening/closing body control device according to claim 1,
wherein the opening/closing body is opened/closed when driven by an actuator, which uses a motor as a drive source, a clutch mechanism is provided on a transmission path of a drive force to the opening/closing body, and the electronic control unit executes the braking control by bringing the clutch mechanism into a connection state in a state where the motor stops.

8. The vehicular opening/closing body control device according to claim 1,
wherein the opening/closing body is a slide door that is opened/closed in the longitudinal direction of the vehicle.

9. The vehicular opening/closing body control device according to claim 1,
wherein the electronic control unit is configured to
detect that the opening/closing body is in a fully-closed state; and
detect a failure of a latch mechanism provided on the opening/closing body,
wherein the latch mechanism is provided with a pawl switch, which is switched between ON and OFF states in conjunction with an operation of a pawl, which is engaged with a latch so as to hold a state where the latch is engaged with a striker, and
the electronic control unit detects occurrence of an engagement failure in which the latch mechanism fails to hold the opening/closing body in the fully-closed state based on the ON and OFF states of the pawl switch, and, in a case where the opening/closing body is in the fully-closed state, the electronic control unit executes braking control for applying the braking force to the opening/closing body when the engagement failure is detected in the latch.

10. The vehicular opening/closing body control device according to claim 9,
wherein the electronic control unit determines that the engagement failure has occurred in the latch mechanism when it is determined that a state where the pawl is disengaged from the latch is continued based on the ON and OFF states of the pawl switch after it is detected that the opening/closing body is in the fully-closed state.

11. The vehicular opening/closing body control device according to claim 9,
wherein the latch mechanism is provided with a full latch switch, which is switched between ON and OFF states as the latch rotates to a position corresponding to the fully-latched state, and the electronic control unit executes determination of detection of the engagement failure for the latch mechanism when the ON and OFF states of the full latch switch are switched.

12. The vehicular opening/closing body control device according to claim 1,
wherein the electronic control unit is configured to detect an opening/closing operation position of the opening/closing body,
wherein the opening/closing body is opened/closed along a movement path, formed by a guide rail, which extends in the longitudinal direction of the vehicle, and a guide roller, which is engaged with the guide rail, and the guide rail has a curved portion, which is curved in the width direction of the vehicle, in a closing operation side end portion, which is disposed in the closing operation direction of the opening/closing body, and
the electronic control unit executes braking control for applying a braking force to the opening/closing body in a case where the opening/closing operation position of the opening/closing body is within a specific range, which is set in the movement path of the opening/closing body to correspond to the curved portion of the guide rail during the traveling of the vehicle.

13. The vehicular opening/closing body control device according to claim 12,
wherein the curved portion includes a corner portion, which deflects the movement path of the opening/ closing body inward in the width direction of the vehicle toward the closing operation direction of the opening/closing body, and the electronic control unit sets a specific range, within which the guide rail and the guide roller are engaged with each other on the closing operation side end portion with respect to the intermediate position of the corner portion rather, and executes the braking control within the specific range.

14. A vehicular opening/closing body control device comprising:

a braking control unit configured to apply a braking force to an opening/closing body provided in an opening in a vehicle;

a traveling state determination unit configured to determine a traveling state of the vehicle;

an abnormality detection unit configured to detect occurrence of a full-closing abnormality in which the opening/closing body is not held in a fully-closed state by a latch mechanism provided on the opening/closing body during the traveling of the vehicle;

a record holding unit configured to hold a detection record of the full-closing abnormality;

a reexamination unit configured to execute re-examination the full-closing abnormality of the opening/closing body; and a record erasing unit configured to erase the detection record of the full-closing abnormality when it is determined that the full-closing abnormality of the opening/closing body has been eliminated via execution of the re-examination, wherein the braking control unit executes braking control for applying a braking force to the opening/closing body based on the detection of the full-closing abnormality of the opening/closing body, in a case where the detection record of the full-closing abnormality is held after a stop of the vehicle, the reexamination unit executes the re-examination, and the braking control unit executes the braking control of the opening/closing body based on the detection record of the full-closing abnormality before the vehicle travels from the stop of the vehicle.

* * * * *